(12) United States Patent
Mohoney

(10) Patent No.: US 7,778,023 B1
(45) Date of Patent: Aug. 17, 2010

(54) DOCKING SYSTEM FOR MP3 PLAYERS AND OTHER PORTABLE ELECTRONIC DEVICES

(76) Inventor: Victor Mohoney, 4102 Manitou Way, Madison, WI (US) 53711

( * ) Notice: Subject to any disclaimer, the term of this patent is extended or adjusted under 35 U.S.C. 154(b) by 0 days.

(21) Appl. No.: 12/400,409

(22) Filed: Mar. 9, 2009

Related U.S. Application Data

(60) Provisional application No. 61/098,483, filed on Sep. 19, 2008.

(51) Int. Cl.
*G06F 1/16* (2006.01)

(52) U.S. Cl. .............................. 361/679.41; 361/679.3; 361/679.56; 710/303; 710/304; 312/223.2

(58) Field of Classification Search ............ 361/679.41, 361/697.56
See application file for complete search history.

(56) References Cited

U.S. PATENT DOCUMENTS

| | | | |
|---|---|---|---|
| 5,229,701 A * | 7/1993 | Leman et al. ............... | 320/115 |
| 5,280,229 A * | 1/1994 | Faude et al. ................ | 320/110 |
| 5,383,091 A | 1/1995 | Snell | |
| D381,664 S | 7/1997 | Williams et al. | |
| 5,708,707 A * | 1/1998 | Halttunen et al. .......... | 379/446 |
| D419,290 S | 1/2000 | Treyer et al. | |
| D422,282 S | 4/2000 | Curtis | |
| D424,573 S | 5/2000 | Maloney | |
| D425,077 S | 5/2000 | Hamilton | |
| D425,905 S | 5/2000 | Finkbeiner | |
| D425,906 S | 5/2000 | Finkbeiner | |
| D425,907 S | 5/2000 | Frye et al. | |
| 6,266,544 B1 | 7/2001 | Tomura et al. | |
| D448,761 S | 10/2001 | Powell | |
| 6,341,218 B1 | 1/2002 | Poplawsky et al. | |
| 6,364,184 B1 | 4/2002 | Hauck et al. | |
| 6,377,825 B1 | 4/2002 | Kennedy et al. | |
| D460,755 S | 7/2002 | Cleary et al. | |
| 6,469,891 B1 * | 10/2002 | Takita et al. ............. | 361/679.4 |
| 6,710,576 B1 | 3/2004 | Kaufman et al. | |
| 6,727,677 B1 | 4/2004 | Bouskila | |
| 6,762,585 B2 * | 7/2004 | Liao ........................... | 320/107 |
| 6,836,643 B2 | 12/2004 | Shealtiel | |
| D501,850 S | 2/2005 | Yoshino | |

(Continued)

*Primary Examiner*—Jayprakash N Gandhi
*Assistant Examiner*—Anthony Q Edwards
(74) *Attorney, Agent, or Firm*—Craig A. Fieschko, Esq.; DeWitt Ross & Stevens S.C.

(57) ABSTRACT

Sleeves for different portable electronic devices (portable media players, wireless telephones, handheld computers, etc.) adapt the outer contours of the devices such that all can fit within the pocket of a standard device dock. Each sleeve situates its portable electronic device within the pocket of the dock such that at least one of its power/communications ports is situated at a standard location. The device dock then also accommodates a connector which fits within the dock pocket, and which has power/communications ports situated at the standard location, such that when the sleeved device is inserted into the pocket, its power/communications ports interface with the power/communications ports of the connector. The connector can incorporate data storage devices, power supplies, interface cables extending to other devices (such as personal computers, stereo systems, etc.) such that it lends the functionality of these devices to the sleeved device situated within the pocket.

41 Claims, 14 Drawing Sheets

U.S. PATENT DOCUMENTS

| | | |
|---|---|---|
| 6,859,532 B2 * | 2/2005 | Tomura et al. .............. 379/446 |
| 6,983,144 B2 | 1/2006 | Janssen et al. |
| 7,016,709 B2 | 3/2006 | Kortum et al. |
| 7,194,291 B2 | 3/2007 | Peng |
| 7,206,407 B2 | 4/2007 | Tomura et al. |
| 7,206,614 B2 | 4/2007 | Kortum et al. |
| D543,541 S | 5/2007 | Chung et al. |
| 7,230,823 B2 * | 6/2007 | Richardson et al. .... 361/679.25 |
| 7,248,901 B2 | 7/2007 | Peiker |
| 7,272,420 B2 | 9/2007 | Falcon et al. |
| D556,681 S | 12/2007 | Kim |
| D561,092 S | 2/2008 | Kim |
| D565,290 S | 4/2008 | Brandenburg et al. |
| 7,480,138 B2 * | 1/2009 | Kogan et al. ........... 361/679.02 |
| 7,499,270 B2 * | 3/2009 | Allen ................... 361/679.56 |
| 7,580,255 B2 * | 8/2009 | Crooijmans et al. .... 361/679.56 |
| 7,583,499 B2 * | 9/2009 | Lin et al. ............... 361/679.58 |
| 7,612,997 B1 * | 11/2009 | Diebel et al. .......... 361/679.56 |
| 2003/0103624 A1 | 6/2003 | Hu |
| 2004/0057199 A1 * | 3/2004 | Azuchi ..................... 361/683 |
| 2005/0086410 A1 | 4/2005 | Landron et al. |
| 2006/0181840 A1 * | 8/2006 | Cvetko ...................... 361/679 |
| 2006/0277555 A1 * | 12/2006 | Howard et al. ............. 720/600 |
| 2006/0279924 A1 * | 12/2006 | Richardson et al. ......... 361/683 |
| 2008/0192410 A1 | 8/2008 | Kumar |
| 2009/0009957 A1 * | 1/2009 | Crooijmans et al. ......... 361/686 |

* cited by examiner

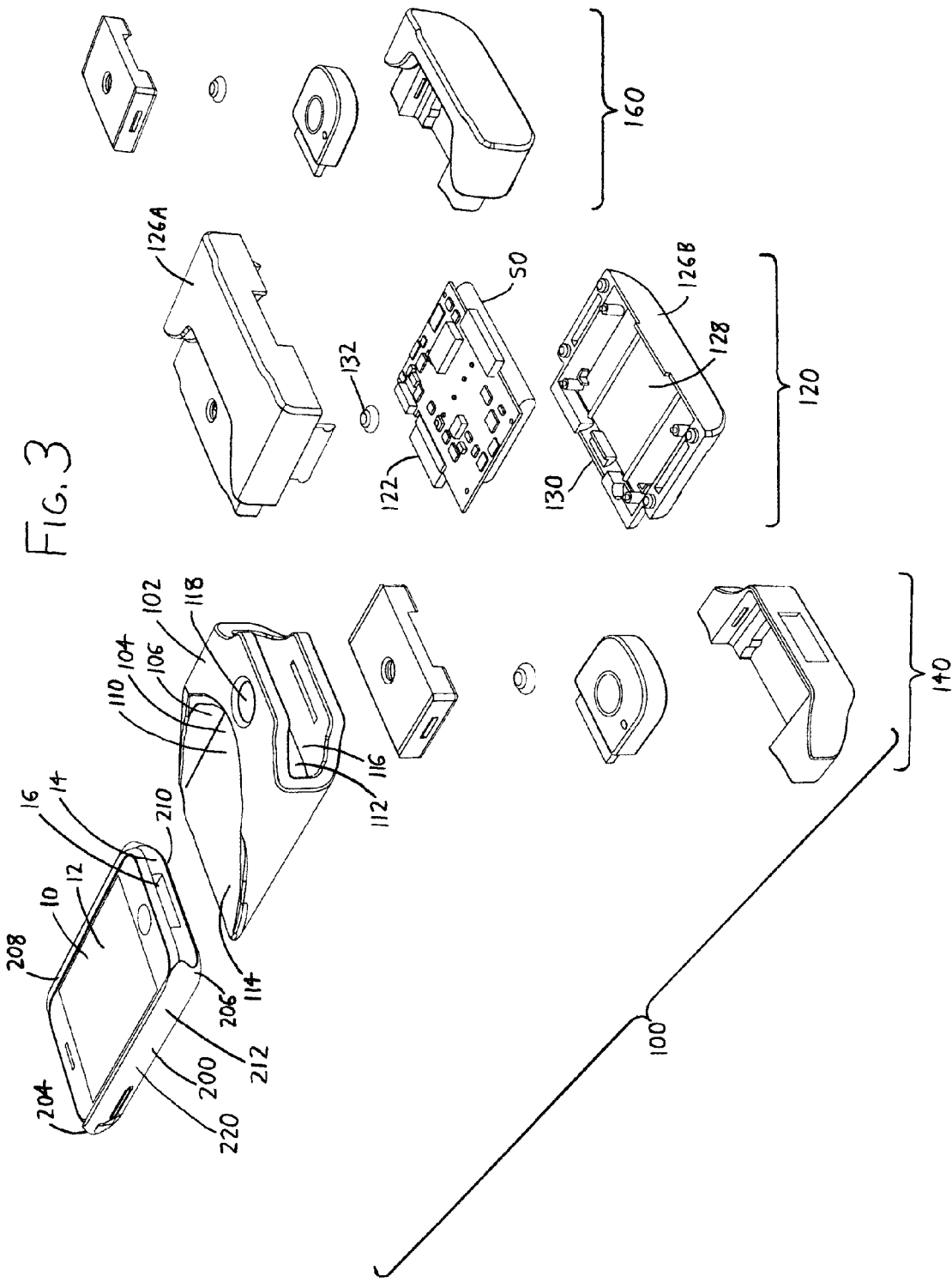

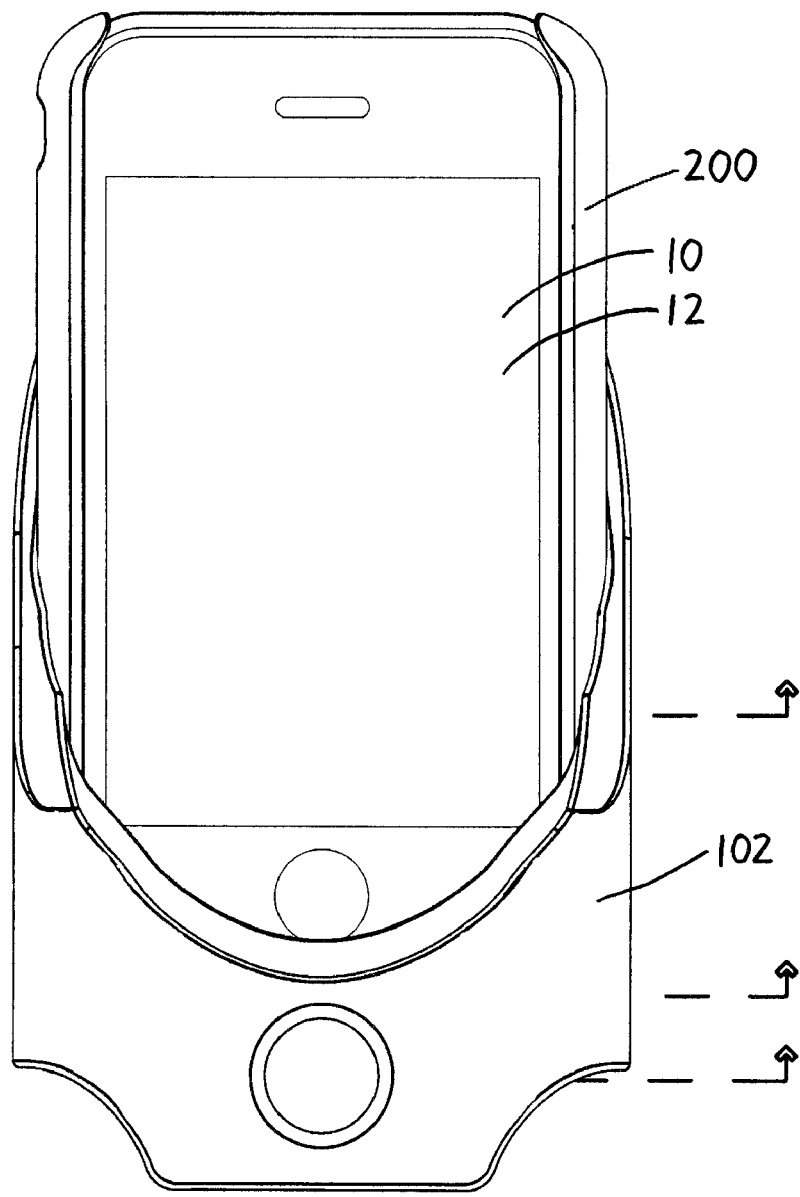
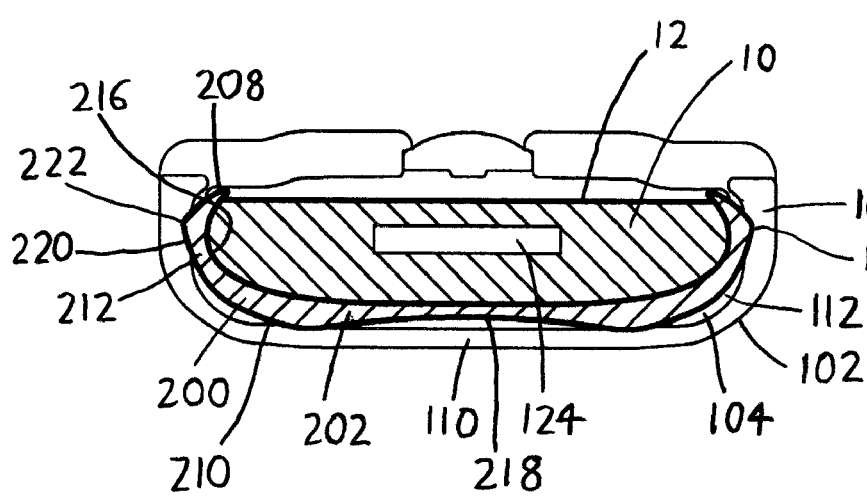

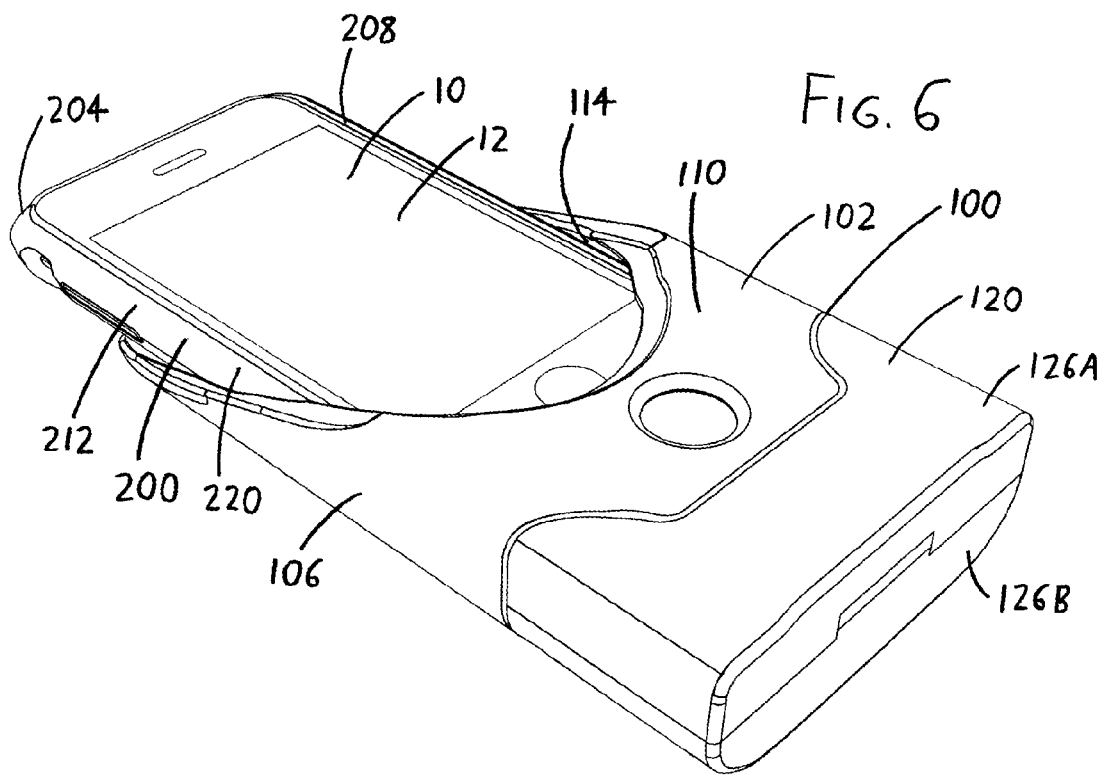
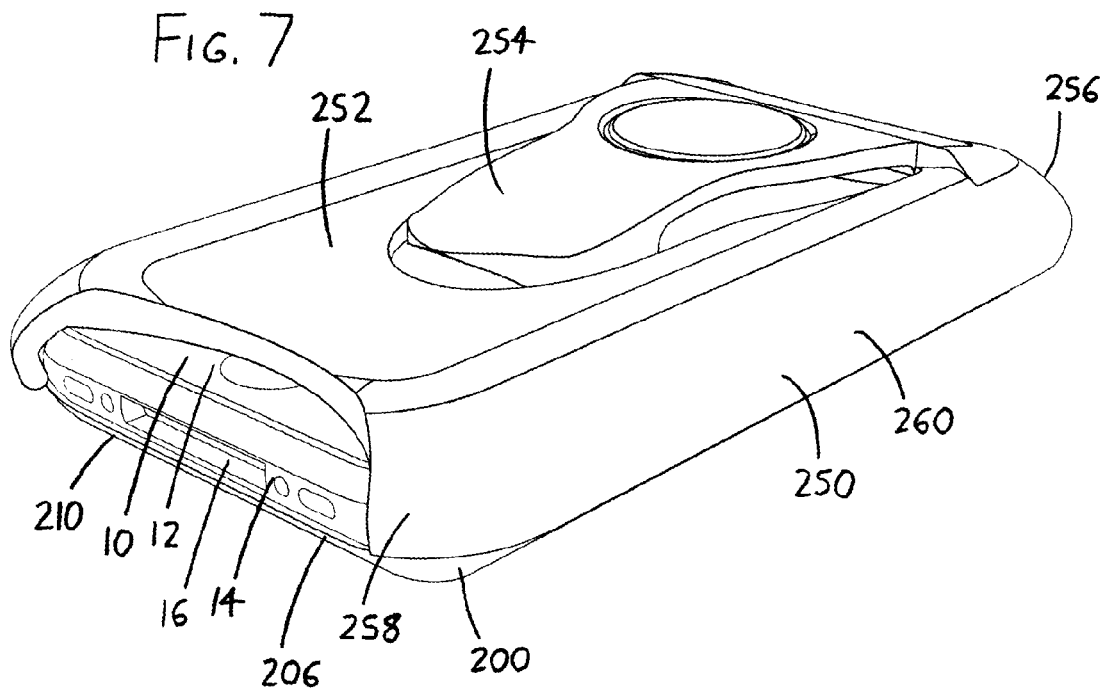

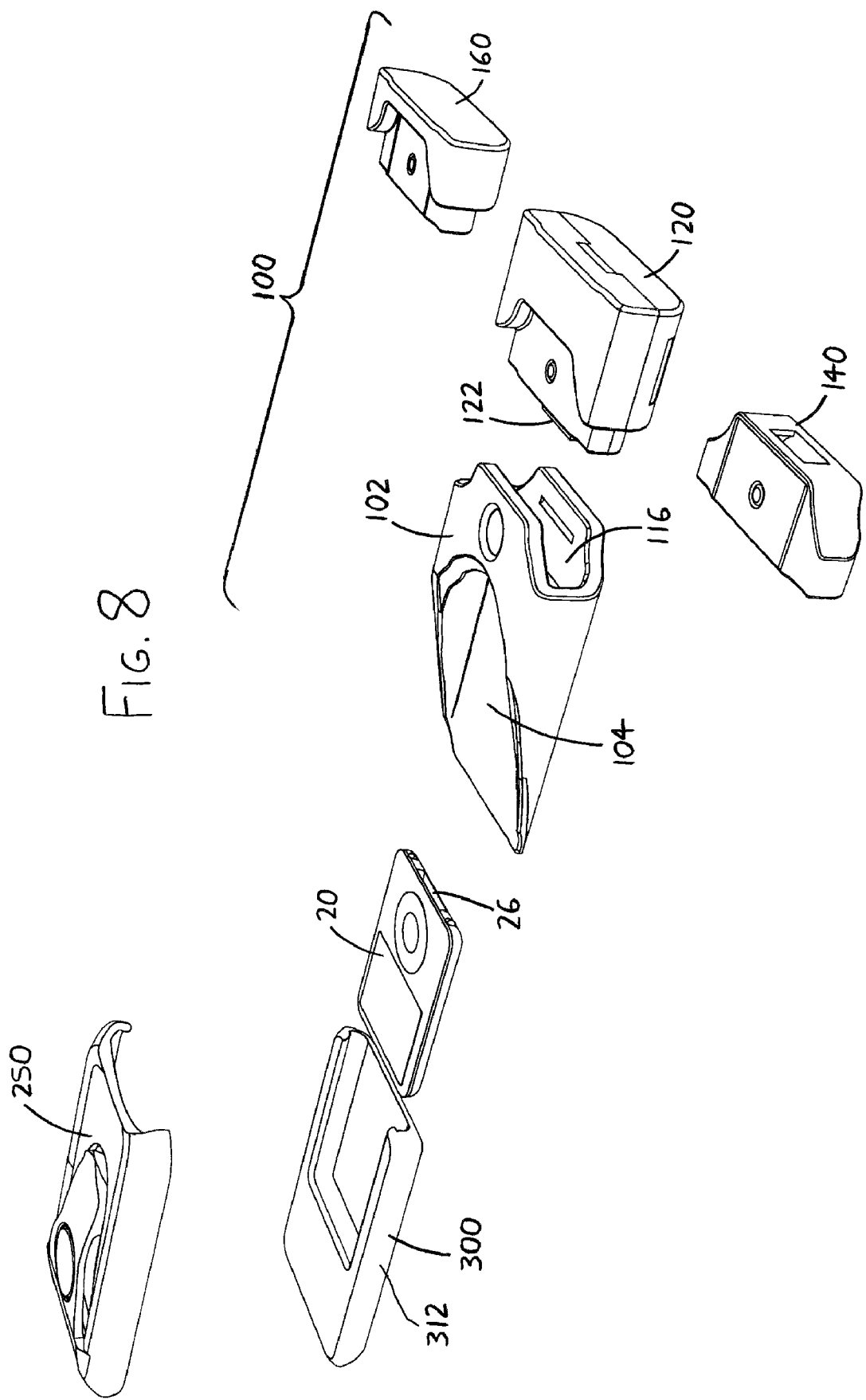

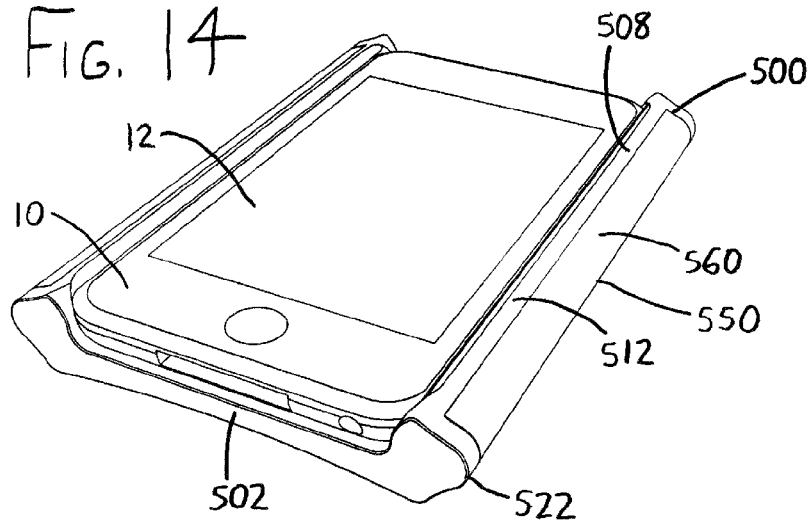
FIG. 14
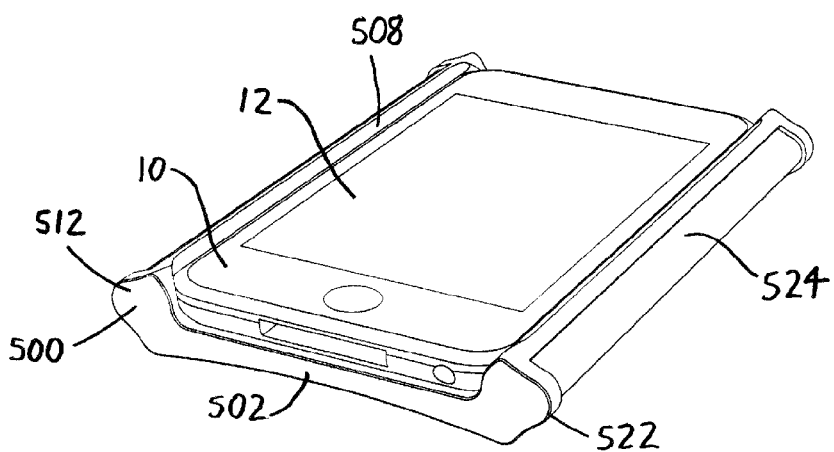
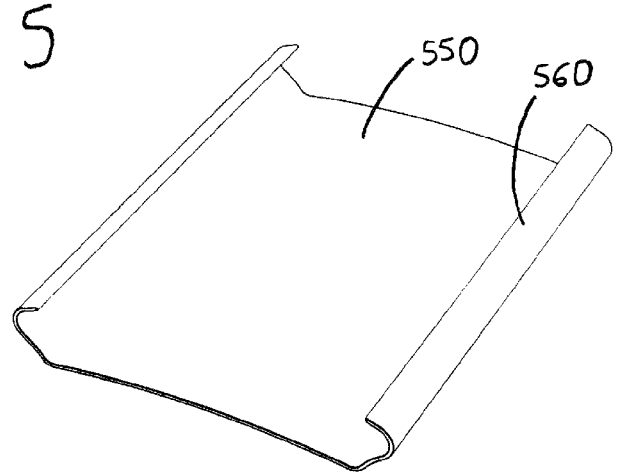
FIG. 15

DOCKING SYSTEM FOR MP3 PLAYERS AND OTHER PORTABLE ELECTRONIC DEVICES

CROSS-REFERENCE TO RELATED APPLICATIONS

This application claims priority under 35 USC §119(e) to U.S. Provisional Patent Application 61/098,483 filed 19 Sep. 2008, the entirety of which is incorporated by reference herein.

FIELD OF THE INVENTION

This document concerns an invention relating generally to interface and docking systems for portable electronic devices such as wireless telephones, handheld computers, and handheld portable media players (e.g., MP3 players), and more specifically to docking systems which can accommodate a variety of different portable electronic devices and which can be readily reconfigured to provide different functionality for a portable electronic device.

BACKGROUND OF THE INVENTION

Portable electronic devices such as wireless telephones, handheld computers, and handheld portable media players (e.g., MP3 players) are in common use, and are often designed to interface with another device such as a computer, the stereo system of a vehicle, an entertainment system, etc. so that data and/or power may be supplied from one device to the other. However, a commonly encountered problem is that the connectors conventionally used on one device do not match the connectors conventionally used on the other device; for example, a computer might have one or more USB (Universal Serial Bus) connectors, or a vehicle's stereo system might utilize an RCA connector, whereas an IPOD portable media player or IPHONE mobile telephone (from Apple Inc., Cupertino, Calif., USA) might use a proprietary 30-pin connector. Thus, users must often use interface cables which have terminal connectors designed to allow one device to communicate with the other, e.g., an interface cable having a USB or RCA connector on one end and a 30-pin connector at the other end. Because of the variety of different devices that can be interfaced, users must often obtain numerous different types of interface cables to allow a portable electronic device to interface with a variety of other devices.

Users also often want to have their portable electronic devices mounted in a fixed location/position when the devices are interfaced with other devices. Thus, it is common for users to utilize "docks," that is, devices which bear sockets for receiving and holding portable electronic devices. These docks often have socket connectors within their sockets such that the portable electronic devices have their device connectors interface with the socket connectors when the portable electronic devices are inserted within the sockets. The socket connectors of the docks then connect to other devices (e.g., personal computers or stereo systems), thereby enabling a docked portable electronic device to communicate data and/or power from and/or to the connected device. Docks tend to suffer from the drawback that the dock sockets are typically designed to accommodate only a single specific make/model of portable electronic device, i.e., only a particular portable electronic device will properly fit within a given dock socket. Thus, a user must usually obtain different docks when interfacing different portable electronic devices to another device. For example, a user may need to obtain one dock to allow interfacing between his portable media player and the stereo system of his vehicle, and another dock to allow interfacing between another portable media player and the stereo system of the vehicle, even where the terminal connectors of the different portable media players are the same: the different configurations of the portable media players do not allow them to fit into a common dock socket. The problem is not easily remedied by simply having a variety of different docks on hand, since swapping one dock for the other may be difficult and inconvenient depending on the type and location of the dock's connection to the vehicle.

The foregoing problems might be referred to as the "interface problem" (the problem of providing an interface connector compatible with a particular portable electronic device) and the "socket problem" (the problem of providing a socket compatible with a particular portable electronic device, wherein the device can be properly fit). Docks often suffer from the interface problem as well as the socket problem, which has further limited their popularity. It would therefore be useful if users had available docking and interface systems which reduced the need for users to obtain multiple different docks and interfaces for use with different portable electronic devices, and which more generally offered greater versatility of use than prior docking and interface systems.

SUMMARY OF THE INVENTION

The invention, which is defined by the claims set forth at the end of this document, is directed to docking systems and related device-docking methods which at least partially alleviate the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings, which are briefly reviewed in the "Brief Description of the Drawings" section following this Summary section of this document.

An exemplary docking system which illustrates features of the invention is illustrated in FIGS. 1-7 in combination with an exemplary portable electronic device 10 (an IPHONE 3G wireless telephone from Apple, Inc.). Referring initially to FIG. 1, this portable electronic device 10 has a front face 12 with display and control features, and a bottom side 14 which bears a device connection port 16 (a 30-pin connector). The docking system then includes a device sleeve 200 into which the portable electronic device 10 may be removably engaged (see FIG. 3), and a device dock 100 configured to receive the device sleeve 200 therein (see FIGS. 4 and 6). In FIG. 1, the device dock 100 is shown disassembled into a dock receiver portion 102 having a dock interior pocket 104 for receiving the sleeve 200 (with the portable electronic device 10 therein), and also having a dock connector portion, with three different exemplary dock connector portions being shown in FIG. 1 at 120, 140, and 160. Each dock connector portion 120, 140, and 160 bears a dock port connector 122, with the dock port connector 122 only being visible in FIG. 1 on the dock connector portion 120 but being seen more extensively in FIGS. 2-3, wherein the dock port connector 120 is chosen to properly interface with the device connection port 16 of the portable electronic device 10. The device sleeve 200 cooperates with the device dock 100 in such a manner that the portable electronic device 10 within the device sleeve 200 (again see FIG. 3) directly interfaces with the dock port connector 122 in the device dock 100 when the device sleeve 200 and portable electronic device 10 are fully inserted within the dock interior pocket 104 of the device dock 100 (again see FIG. 6) Each of the device sleeve 200 and device dock 100 will now be discussed in greater detail in turn.

The device sleeve 200 is configured to extend about a portion of the exterior of the portable electronic device 10 to removably engage the portable electronic device 10 within the device sleeve 200. Windows/ports formed in the device sleeve 200 leave the device connection port 16 exposed, as better seen in FIG. 3. The device sleeve 200 includes a sleeve body 202 having a top sleeve side 204 and an opposing bottom sleeve side 206; a front sleeve side 208 and an opposing rear sleeve side 210 which extend between the top and bottom sleeve sides 204 and 206; and opposing lateral sleeve sidewalls 212 extending between the top and bottom sleeve sides 204 and 206, and also between the front and rear sleeve sides 208 and 210. The sleeve sidewalls 212 extend outwardly from the sleeve body 202 to define a device insertion space 214 (see FIGS. 1-2) between the sleeve sidewalls 212, and adjacent the sleeve body 202, into which the portable electronic device 10 may be inserted. The sleeve sidewalls 212 include concave inner sidewall faces 216 which face inwardly toward each other across the device insertion space 214, wherein the portable electronic device 10 may rest within the device insertion space 214 with edges of the portable electronic device 10 received within the concave inner sidewall faces 216. The sleeve sidewalls 212 are preferably spaced at least substantially uniformly away from each other save for at the top and bottom sleeve sides 204 and 206, where the sleeve sidewalls 212 may extend inwardly toward each other. As a result, the device insertion space 214 is narrower at the top and bottom sleeve sides 204 and 206 and broader therebetween, with the inwardly-extending sidewalls 212 at the top and bottom sleeve sides 204 and 206 and the concavity of the inner sidewall faces 216 assisting in firmly retaining the portable electronic device 10 within the device sleeve 200. At the same time, as seen in FIG. 5 (which presents a cross-sectional view of FIG. 4), the sleeve body 202 is preferably formed thinner at a location 218 spaced at least substantially halfway between the sleeve sidewalls 212, and extending between the top and bottom sleeve sides 204 and 206, thereby allowing the sleeve sidewalls 212 to flex apart so that the portable electronic device 10 may be snapped into and out of the device sleeve 200 (provided it is made of appropriately flexible plastic, metal, or other materials).

The sleeve sidewalls 212 also include outer sidewall faces 220 opposite the inner sidewall faces 216. When the device sleeve 200 (and any portable electronic device 10 therein) is inserted within the dock interior pocket 104 of the dock receiver portion 102 of the device dock 100, portions of the pocket walls on opposing sides of the dock interior pocket 104 preferably complementarily engage portions of the outer sidewall faces 220. In a preferred arrangement, the outer sidewall faces 220 each include a sleeve ridge 222 thereon which extends in a direction between the top and bottom sleeve sides 204 and 206 (see FIGS. 1 and 5), and the corresponding opposing pocket walls 106 each have ridge slots 108 defined therein (see FIG. 5), so that the sleeve ridges 222 complementarily engage within the ridge slots 108 when the device sleeve 200 is received within the dock interior pocket 104. The sleeve ridges 222 and ridge slots 108 then serve to guide the portable electronic device 10 during the insertion of the device sleeve 200 into the dock interior pocket 104, so that the device connection port 16 of the portable electronic device 10 is aligned to directly interface with the dock port connector 122 of the device dock 100 when the device sleeve 200 (and the portable electronic device 10 therein) is fully received within the dock interior pocket 104 (assuming the device connection port 16 and the dock port connector 122 are compatible).

As noted previously, the dock receiver portion 102 of the device dock 100 has a dock interior pocket 104 wherein the dock port connector 122 is situated, with the dock port connector 122 being configured to directly interface with the device connection port 16 of the portable electronic device 10 when the device connection port 16 and dock port connector 122 are engaged together. The dock interior pocket 104 is bounded by pocket walls which include lateral pocket walls 106 (FIGS. 1 and 3) wherein the ridge slots 108 are defined, and front and rear pocket walls 110 between the lateral pocket walls 106. These pocket walls 106 and 110 are not configured and spaced to directly receive the portable electronic device 10 alone, without the device sleeve 200; rather, when the portable electronic device 10 is inserted within the dock interior pocket 104 without the device sleeve 200, the device 10 is loosely received therein between the pocket walls 106 and 110. Further, the pocket walls 106 and 110 will not direct the portable electronic device 10 alone, without the device sleeve 200, such that its device connection port 16 is guided to directly interface with the dock port connector 122: if the portable electronic device 10 alone is situated in abutment with any one or more of the pocket walls 106 and 110 and slid into the dock interior pocket 104, the device connection port 16 will not be aligned to directly interface with the dock port connector 122. Thus, the device sleeve 200 is needed to adapt the portable electronic device 10 so that it snugly fits within the dock interior pocket 104, and so that the device connection port 16 is aligned with the dock port connector 122. The device sleeve 200 is configured to be complementarily received within the dock interior pocket 104, with at least a portion of its exterior surface abutting the pocket walls 106 and 110 when the device sleeve 200 is received within the dock interior pocket 104, such that the device connection port 16 (which, again, is left exposed by the device sleeve 200) will be aligned to directly interface with the dock port connector 122 when the device sleeve 200 (with the portable electronic device 10 therein) is fully received within the dock interior pocket 104. Preferably, as can be seen in FIG. 5, the device sleeve 200 has at least a major portion of its outer circumference spaced from the pocket walls 106 and 110 when fully received within the dock interior pocket 104. To illustrate, in FIG. 5, both the front sleeve side 208 and the rear sleeve side 210 (or at least portions thereof) are respectively spaced from the front and rear pocket walls 110. This arrangement is believed to provide more reproducible and easily achieved interfacing between the device connection port 16 and the dock port connector 122 over time, during which the invention may wear and may be subjected to temperature extremes which cause warping (as where the device dock 100 is left in a car). Additionally, this arrangement allows the dock interior pocket 104 to be sized to fit other and additional larger device sleeves and portable electronic devices (as discussed below), and regardless of the size and configuration of the sleeved portable electronic device 10, the sleeve ridges 222 and ridge slots 108 (or other alignment arrangement) will serve to position the device sleeve 200 such that the portable electronic device 10 therein directly interfaces with the dock port connector 122. This arrangement also avoids a problem common with prior protective sleeves and docks wherein the docks cannot accommodate portable devices unless their sleeves are removed, requiring an annoying process of unsleeving and sleeving a device when installing and removing the device within a dock. This problem in turn often leads to inadvertent loss of a sleeve because its location is forgotten when the device is unsleeved and docked. Here, since the device 10 remains in its sleeve 200 when docked, the sleeve 200 may remain on the device 10 at all times, thereby protecting the device 10 at all times.

Referring back to FIG. 1, the dock receiver portion 102 and dock connector portion 120 of the device dock 100 can be removably engaged together to form an assembled device dock 100, as with the device dock 100 of FIG. 6. The dock receiver portion 102 is preferably formed with an internal passage 112 which defines at least a portion of the dock interior pocket 104, with the internal passage 112 extending between a dock device insertion mouth 114 into which the device sleeve 200 may be received, and an opposing dock connector insertion mouth 116 into which the dock connector portion 120 may be removably engaged. This allows a variety of different dock connector portions 120, 140, 160 to be combined with the dock receiver portion 102 to form a device dock 100, with FIG. 1 illustrating a battery dock connector portion 120 (i.e., a dock connector containing a battery for interfacing with a portable electronic device 10); a wireless transceiver dock connector portion 140 (i.e., a dock connector containing a Bluetooth or other wireless transceiver for interfacing with a portable electronic device 10); and a dummy dock connector portion 160 (i.e., a dock connector which merely closes the internal passage 112 so that the device dock 100 simply serves to retain a sleeved portable electronic device 10 within the dock interior pocket 104). It should be understood that other types of dock connector portions are possible as well, such as ones incorporating memories/data storage devices, mini-printers, optical readers (e.g., scanners or biometric readers such as fingerprint or retinal readers), cameras/microphones, hubs with multiple input/output ports or cables, power supplies, and so forth. A user may therefore adapt any one of a number of portable electronic devices to be received within the device dock 100 by fitting the portable electronic device in question with a suitable device sleeve, and may also adapt the device dock 100 to provide the desired connector interface and functionality by choice of an appropriate dock connector portion. The device dock 100 is configured to situate the dock port connectors 122 at a standard location—e.g., at the location 124 in FIG. 5—and as discussed above, the device sleeves are then configured (in conjunction with the device dock 100) to align the device connection port 16 with the dock port connectors 122. Since the dock connector portions 120/140/160 have their dock port connectors 122 situated within the dock interior pocket 104 at the standard location, and protected by the pocket walls 106 and 110, the dock port connectors 122 are protected from inadvertent breakage, as often occurs where cables or other devices to be interfaced with a portable electronic device 10 have their dock port connectors 122 left exposed without any surrounding structure, and without any means to reliably guide the device connection port 16 to directly interface with the dock port connectors 122.

The various types of dock connector portions 120/140/160 could be individually manufactured such that each type has inner components which provide the desired functionality (e.g., batteries, wireless transmitters/receivers, memories, etc.), an outer housing which is then specially designed to fit about the inner components in question, and a dock port connector 122 extending from these inner components to be exposed on the outer housing (at the aforementioned standard alignment location). However, referring to FIGS. 2-3 for an example, a preferred scheme for generating the dock connector portions 120/140/160 is to have a "blank" outer housing formed in two or more dock connector portion sections 126A and 126B which have a cavity 128 for receiving one of several different types of "standalone" devices 50 (i.e., off-the-shelf devices which provide the desired functionality). The dock connector portion sections 126A and 126B then position the chosen standalone device 50 so that its dock port connector 122 is exposed at the aforementioned standard alignment location 124 (FIG. 5) when the dock connector portion sections 126A and 126B are affixed together to complete the dock connector portion 120. Thus, a preexisting off-the-shelf standalone device 50—here, a conventional third-party off-the-shelf battery pack—can be adapted into a dock connector portion 120 by fitting the chosen standalone device 50 within the cavity 128 defined by the dock connector portion sections 126A and 126B (possibly with spacers/fillers helping to fill the cavity 128 about the standalone device 50, and to appropriately position the standalone device 50 so that its dock port connector 122 is exposed at the aforementioned standard alignment location). The dock connector portion sections 126A and 126B can then be fit together about the standalone device 50 to enclose the standalone device 50 within the dock connector portion 120. An opening 130 can be defined in the connected dock connector portion sections 126A and 126B through which the dock port connector 122 of the standalone device 50 may extend, so that the dock port connector 122 is exposed to allow it to interface with the device connection port 16. If the standalone device 50 has cables or the like extending therefrom, additional openings might be defined in the connected dock connector portion sections 126A and 126B so that the cables can extend through these additional openings. Thus, for example, a standalone device 50 might simply take the form of an interface cable with attached terminal connectors (e.g., a 30-pin terminal connector at one end of the cable for interfacing with the portable electronic device 10, and a USB connector at the other end of the cable for interfacing with a computer or the like). One of the terminal connectors can be affixed within the dock connector portion sections 126A and 126B to have its dock port connector 122 fixed at the desired standard location to be exposed for interfacing with a device connection port 16. The connected interface cable might then extend from an opposite side of the resulting dock connector portion 120.

Referring then to FIGS. 8-10, the device dock 100 of FIG. 1 is depicted with a different portable electronic device 20, here an IPOD NANO media player from Apple, Inc., and a different device sleeve 300. The device sleeve 300 is configured to receive the portable electronic device 20 therein, and to guide the device connection port 26 of the portable electronic device 20 to directly interface with the dock port connector 122 of the device dock 100 when the device sleeve 300, with the portable electronic device 20 engaged therein, is fully received within the dock interior pocket 104. The device sleeve 300, as with the device sleeve 200, positions its portable electronic device 20 within the dock interior pocket 104 so that the device connection port 26 is in alignment with the standard position 124 (FIG. 10) of the dock port connector 122. As can be seen in FIG. 10, the device sleeve 300 can be configured somewhat differently than the device sleeve 200, though it still includes sleeve ridges 322 which help to achieve the necessary alignment. FIGS. 11-13 then show the device dock 100 of FIG. 1 in conjunction with a device sleeve 400 which operates in generally the same manner as the aforementioned device sleeves 200 and 300, but which is designed to receive yet another portable electronic device 30, here an IPOD CLASSIC media player from Apple, Inc. It should be apparent that with use of an appropriately-configured device sleeve, almost any portable electronic device can be reconfigured to be firmly engaged within the device dock 100 with its device connection port directly interfaced with the dock port connector 122.

The system can be provided with additional components/accessories to further enhance its versatility. One such accessory is illustrated in FIG. 1 in the form of a sleeve cover 250, which removably engages the device sleeve 200 to fit over the exposed front face 12 of the portable electronic device 10, thereby further protecting the portable electronic device 10 (see FIG. 7). The sleeve cover 250 has a cover body 252 with a clip 254 to allow a user to clip the portable electronic device 10, with device sleeve 200 and sleeve cover 250, to a belt, pocket, or the like. The sleeve cover 250 has opposing top and bottom cover sides 256 and 258, and opposing lateral cover sidewalls 260 which extend outwardly from opposite sides of the cover body 252 between the top and bottom cover sides 256 and 258. The cover sidewalls 260 include inner sidewall faces 262 facing inwardly toward each other across a sleeve insertion space 264 defined between the inner sidewall faces 262 and adjacent the cover body 252, with the inner sidewall faces 262 being concave. The sleeve cover 250 may then receive the device sleeve 200 within the sleeve insertion space 264 with the sleeve ridges 222 being received within the concave inner sidewall faces 262 of the cover sidewalls 260, allowing the sleeve cover 250 to be "snapped" onto or off of the device sleeve 200. So that the sleeve cover 250 may have a thinner profile, the sleeve ridges 222 on the device sleeve 200 are preferably spaced closer to the front sleeve side 208 than the rear sleeve side 210. The sleeve cover 250 usefully addresses a problem common with prior device sleeves in that these either do not bear clips, and provide no easy means for attaching a clip, or otherwise permanently bear a clip and are therefore bulky and inconvenient for use when the user has no need for the clip.

Further advantages, features, and objects of the invention will be apparent from the remainder of this document in conjunction with the associated drawings.

BRIEF DESCRIPTION OF THE DRAWINGS

FIG. 3 presents the arrangement of FIG. 1 with the portable electronic device 10 shown received within the sleeve 200, and with the dock connector portions 120, 140, and 160 shown in an exploded state (and with FIG. 3 lacking the sleeve cover 250 shown in FIG. 1).

FIG. 4 is a front elevational view of the portable electronic device 10 of FIG. 1 shown received within the sleeve 200, with the sleeved device 10 in turn being received within the dock receiver portion 102.

FIG. 5 is a cross-sectional view of the arrangement of FIG. 4, showing the portable electronic device 10 within the sleeve 200, and the sleeved device 10 in turn being within the dock receiver portion 102, and also showing how ridge slots 108 in the lateral pocket walls 106 of the dock receiver portion 102 receive ridges 222 on the outer sidewall faces 220 of the sleeve 200 to situate the connection port 16 (seen in FIG. 1) of the portable electronic device 10 at a standard alignment location 124 so that it is automatically aligned to directly interface with a dock port connector 122 (FIG. 1) of a dock connector portion 120 (FIG. 1).

FIG. 6 is a perspective view of the arrangement of FIG. 5, showing the dock connector portion 120 installed in the dock receiver portion 102 so that it is directly interfaced with the portable electronic device 10.

FIG. 7 is a perspective view of the portable electronic device 10 of FIG. 1 shown installed within the device sleeve 200, with the sleeved device 10 in turn being installed within the sleeve cover 250 so that the front face 12 of the sleeved device 10 is protected, and so that a clip 254 is installed on the sleeved device 10.

FIG. 8 is an exploded perspective view showing the device dock 100 (the dock receiver portion 102 in combination with one or more of connector portions 120, 140, and 160), and the sleeve cover 250, of FIG. 1, in conjunction with a different portable electronic device 20 and a device sleeve 300 adapted to receive this device 20 and situate it, when the sleeved device 20 is within the dock receiver portion 102, such that its device connection port 26 is in alignment with the dock port connector 122 of the connector portion 120.

FIG. 14 is a perspective view of another exemplary device sleeve 500 with the portable electronic device 10 of FIG. 1 received therein, and showing a sleeve cover 550 fit about the rear of the sleeve 500 and engaging the sleeve sidewalls 512.

FIG. 15 is a perspective view of the device sleeve 500 of FIG. 14 wherein the sleeve cover 550 is shown removed from its sleeve cover pocket 524 on the sleeve 500.

DETAILED DESCRIPTION OF PREFERRED VERSIONS OF THE INVENTION

Figure 1:
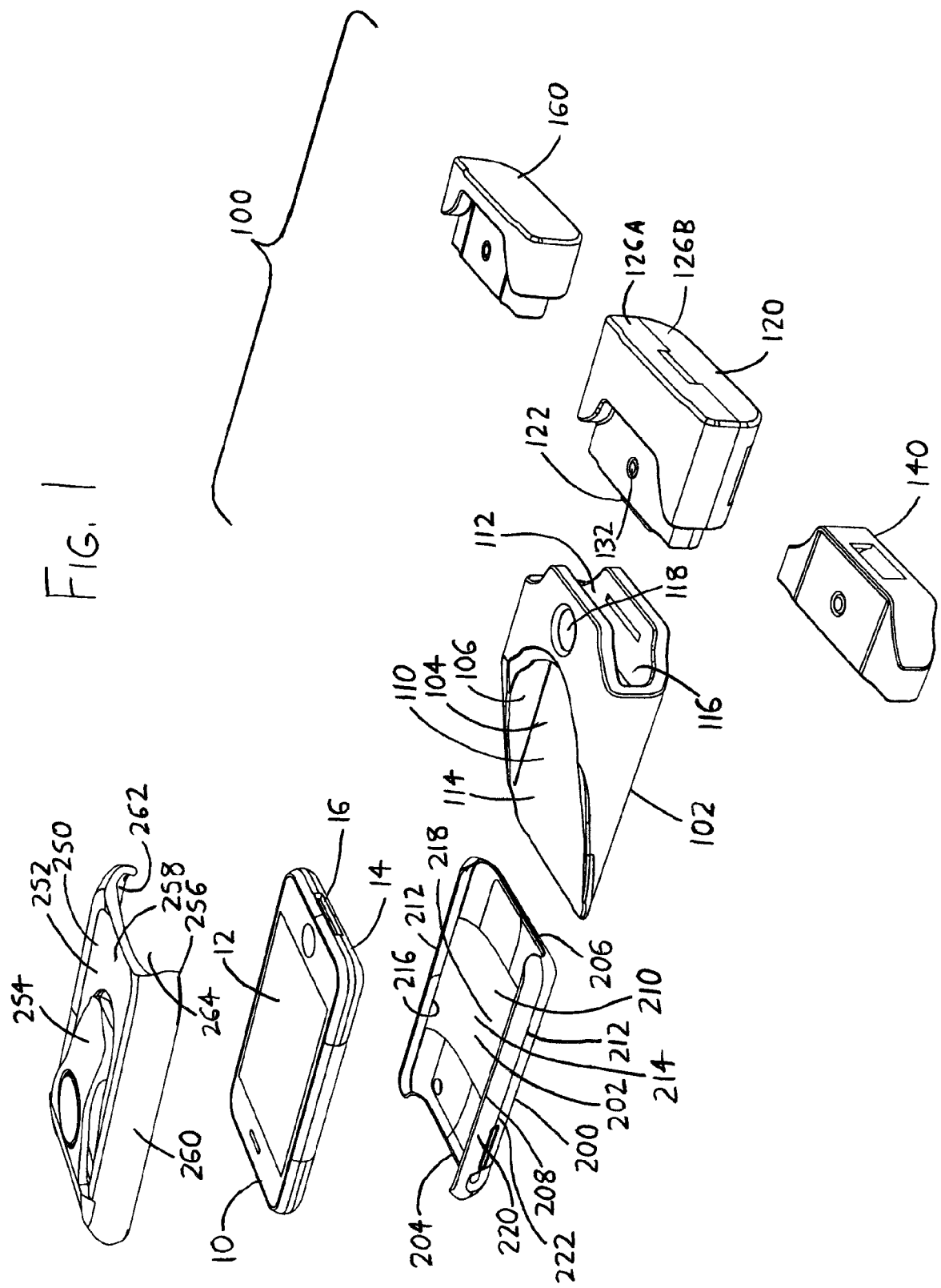
FIG. 1 is an exploded perspective view of a first exemplary version of the invention, depicting a device sleeve 200 positioned ready to receive a portable electronic device 10, with the sleeved device 10 thereafter being receivable within the dock receiver portion 102 of a device dock 100, and with the device dock 100 also receiving a variety of dock connector portions 120, 140, and 160—each having a desired functionality—to interface with the device 10. The sleeve 200 and dock receiver portion 102 cooperate to situate the device connection port 16 of the device 10 in a standard location (seen at 124 in FIG. 5), and the dock connector portions 120, 140, and 160, when installed in the dock receiver portion 102, situate their dock port connectors 122 at this standard location so that when the sleeved device 10 is installed in the dock receiver portion 102, the device connection port 16 of the device 10 directly interfaces with the dock connector portions 120, 140, and 160. A sleeve cover 250 is also depicted in a position ready to receive the device 10 (once the device 10 is installed in the sleeve 200).
Figure 2:
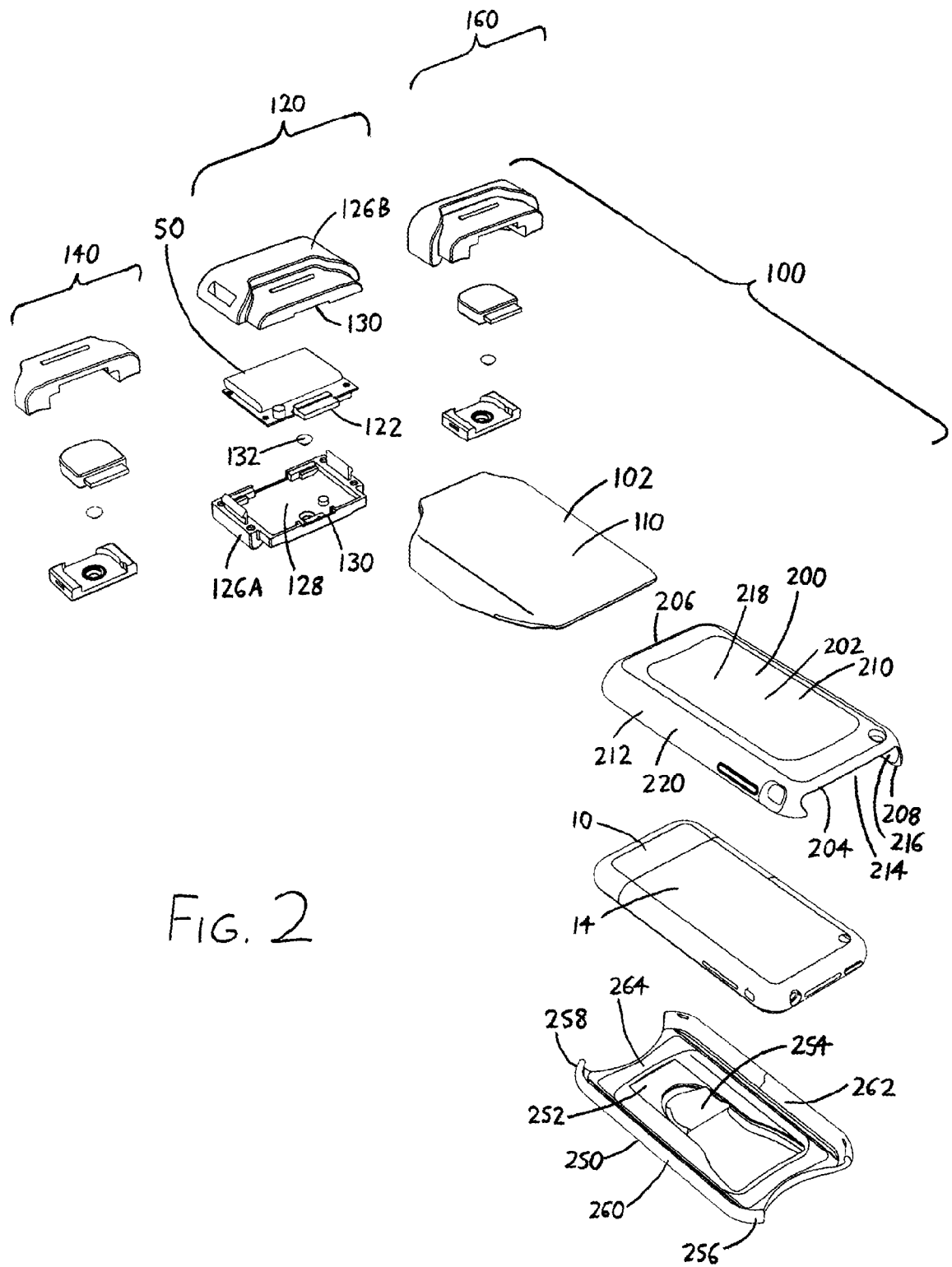
FIG. 2 is an inverted view of FIG. 1, showing the arrangement of FIG. 1 from the bottom, and also showing the dock connector portions 120, 140, and 160 in an exploded state, whereby it is seen that the dock connector portions 120, 140, and 160 are formed in sections (e.g., sections 126A and 126B) configured to receive off-the-shelf standalone devices (e.g., device 50), and configured to fit about these devices to fix them in a location such that their dock port connectors 122 are positioned to directly interface with the portable electronic device 10 (when the device 10 is received within the sleeve 200, and installed within the dock receiver portion 102 of the dock 100).
Figure 9:
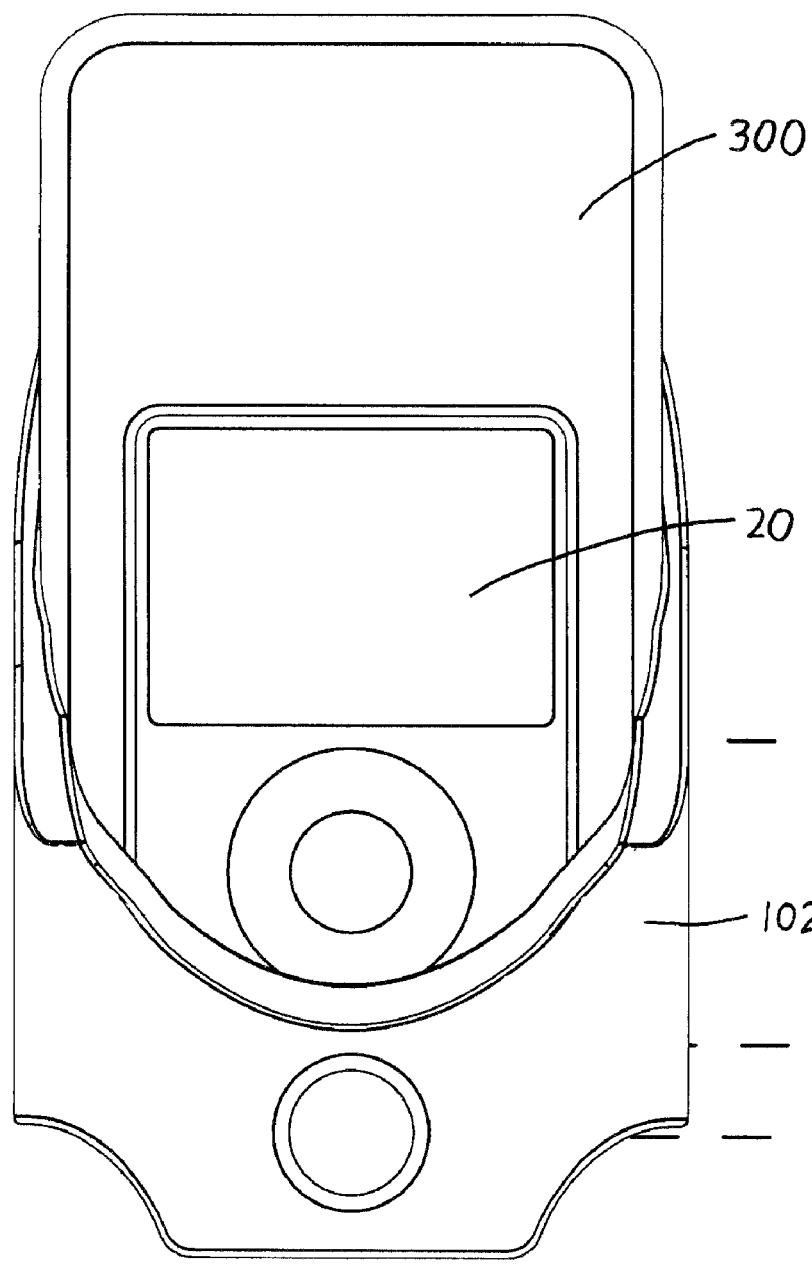
FIG. 9 is a front elevational view of the portable electronic device 20 of FIG. 8 shown received within the sleeve 300, with the sleeved device 20 in turn being received within the dock receiver portion 102.

Throughout this document, unless specified otherwise, the following terms should be understood to have the following meanings.

The term "deviceconnection port," when referring to a connection port of a portable electronic device, refers to a port for the input and/or output of signals (such as data) and/or power. As examples, a device connection port might be a female socket (or male plug) for transmission of DC power into and/or out of the electronic device; a female socket (or male plug) meeting the RS-232 standard for transmission of data into and/or out of the electronic device; or a female socket (or male plug) meeting the USB standard for transmission of data into and/or power into and/or out of the electronic device. In the context of the preferred versions of the invention illustrated in the accompanying drawings, the device connection port is generally depicted as a 30-pin connector, which is (at the time of this document's preparation) conventionally used in IPOD/IPHONE devices for transmission of power and/or data into and/or out of the IPOD/IPHONE device.

The term "dock port connector," when referring to a device dock, refers to a connector designed to interface with a device connection port. Thus, as an example, where a device connection port takes the form of a female socket for transmission of DC power into the electronic device, a complementary dock port connector would be a male plug configured to be received in the female socket.

The term "direct interface," when referring to a direct interface between a portable electronic device connection port and a device dock port connector, refers to engagement of the device connection port and dock port connector without any intermediate components therebetween. Thus, for example, a direct interface between a device connection port in the form of a female socket and a dock port connector in the form of the male plug would be the male plug's insertion within the female socket.

The term "standalone device," when referring to a device provided within the dock connector portion, refers to a device sold in a finished state to ordinary consumers off-the-shelf in department stores, electronics stores, computer stores, and the like, as opposed to an unfinished device (one without a housing or otherwise featuring exposed internal structure) sold primarily to manufacturers for subsequent incorporation into another device (which might then be sold in department stores, electronics stores, computer stores, and the like). To illustrate, standalone devices can take the form of power supplies (e.g., batteries or rechargers), wireless transmitters and/or receivers, memories (e.g., hard drives or solid-state memories), and terminal connectors and any interface cables leading therefrom (e.g., a 30-pin terminal connector and its attached interface cable leading to an opposing 30-pin or other terminal connector, allowing a device connected at one terminal connector to communicate with a device at the other terminal connector), so long as such devices are provided in a finished form.

Figure 11:
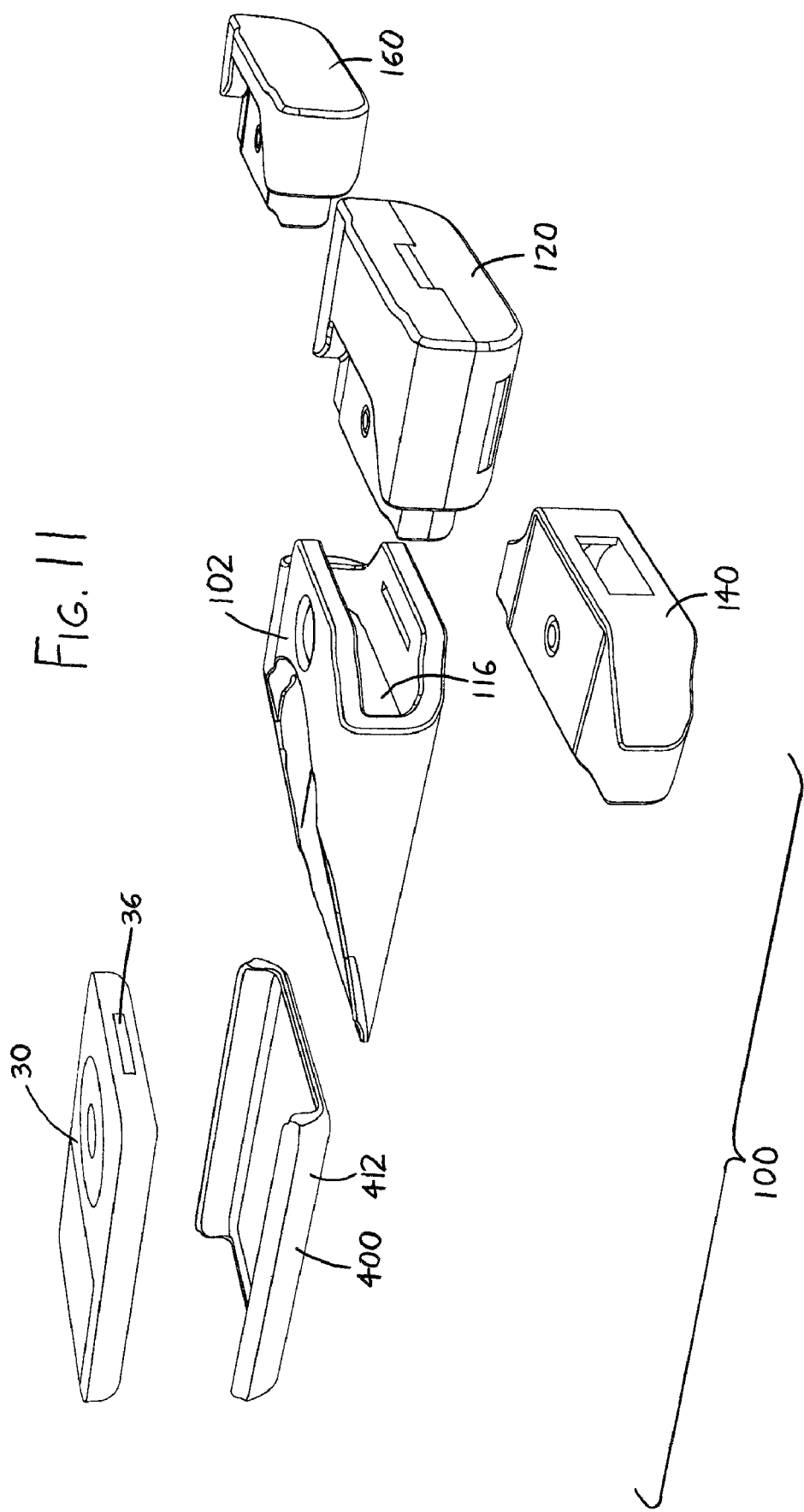
FIG. 11 is an exploded perspective view showing the device dock 100 (the dock receiver portion 102 in combination with one or more of connector portions 120, 140, and 160) of FIG. 1 in conjunction with yet another portable electronic device 30, and with a sleeve 400 adapted to receive this device 30 and situate it, when the sleeved device 30 is within the dock receiver portion 102, such that its device connection port 36 is in alignment with the dock port connector (not visible) of the selected connector portion 120, 140, and 160.
Figure 12:
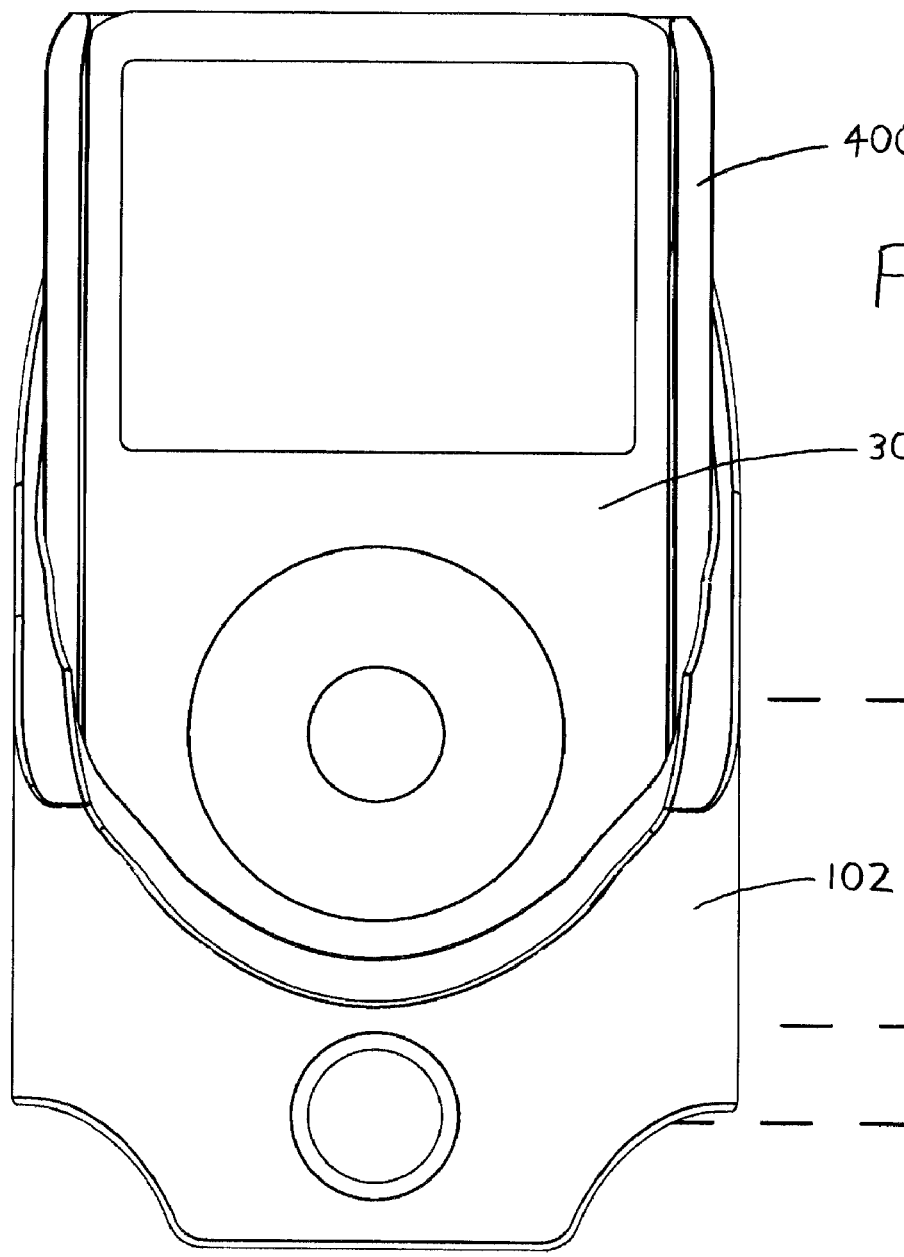
FIG. 12 is a front elevational view of the portable electronic device 30 of FIG. 11 shown received within the sleeve 400, with the sleeved device 30 in turn being received within the dock receiver portion 102.
Figure 13:
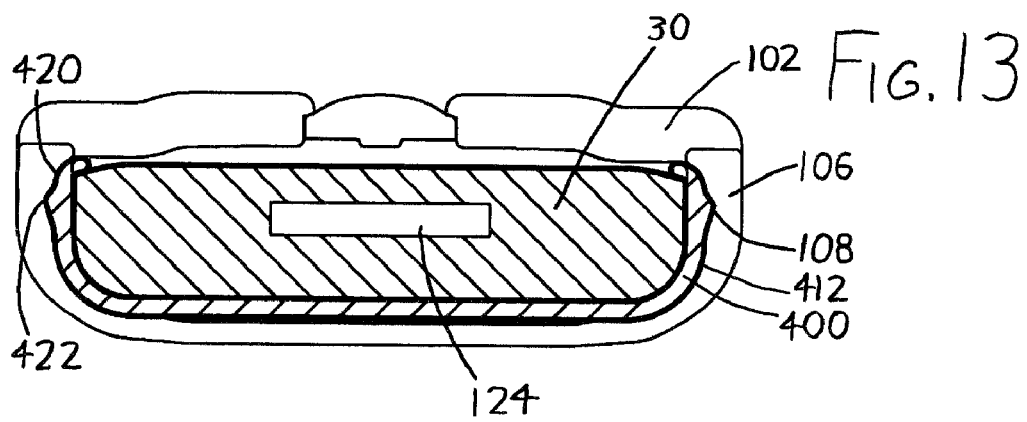
FIG. 13 is a cross-sectional view of the arrangement of FIG. 12, showing the portable electronic device 30 within the sleeve 400, and the sleeved device 30 in turn being within the dock receiver portion 102, with the ridge slots 108 in the lateral pocket walls 106 of the dock receiver portion 102 receiving ridges 422 on the outer sidewall faces 420 of the sleeve 400 to situate the connection port 36 (seen in FIG. 11) of the portable electronic device 30 at the standard alignment location 124 so that it is automatically aligned to directly interface with the selected connector portion 120, 140, and 160 (FIG. 11).
Figure 16:
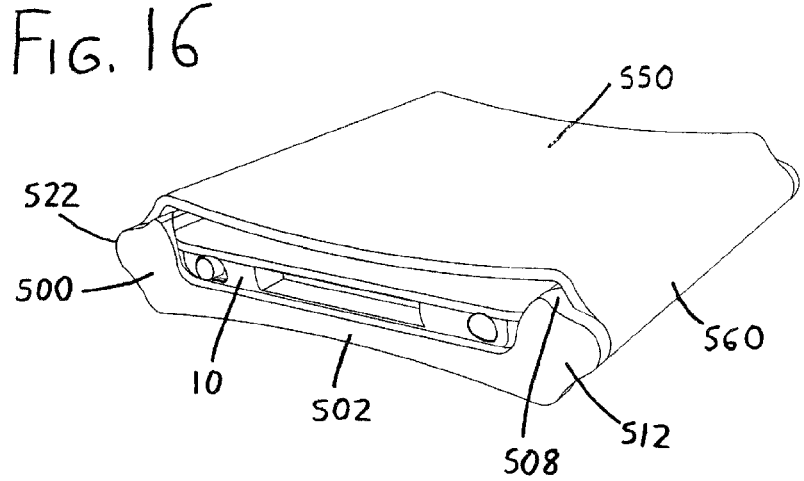
FIG. 16 is a perspective view of the device sleeve 500 of FIGS. 14-15 wherein the sleeve cover 550 is shown fit about the front sleeve side 508 to protectively cover the portable electronic device 10.

When it is said that a device sleeve receives a portable electronic device therein, this should be understood as meaning that the device sleeve receives the portable electronic device snugly, with the device sleeve and portable electronic device fitting together in a complementary fashion, rather than an ill-fitting, forced arrangement, as might be achieved (for example) if the portable electronic device 30 of FIGS. 11-13 was fit within the device sleeve 200 of FIGS. 1-6.

Expanding on the discussion above, it should be apparent from a review of FIGS. 1-13 that the invention allows one to take a selected portable electronic device (e.g., any of portable electronic devices 10, 20, or 30), and fit it in an appropriate protective sleeve (e.g., sleeves 200, 300, and 400), with the sleeve helping to protect the device from scratching, shock, and breakage. The device sleeves 200, 300, 400, etc. also allow the user to at least partially personalize his/her portable electronic device 10, 20, 30, etc. since the sleeves may have a color/decoration scheme chosen by the user. The sleeves 200, 300, 400, etc. are also configured such that they adapt the device 10, 20, 30, etc. in question to snugly fit within the device dock 100, particularly its dock receiver portion 102, in such a manner that the sleeved device is not easily dislodged therefrom. As discussed previously, the sleeves 200, 300, and 400 serve to position the device connection port 16, 26, 36, etc. at the standard alignment location 124 (shown in FIGS. 5, 10, and 13) such that regardless of the sleeved device 10, 20, 30, etc. fit within the dock 100 and its dock receiver portion 102, the device's connection port 16, 26, 36 is always at the same location within the dock interior pocket 104 when the sleeved device is inserted therein. A dock connector portion 120, 140, 160, etc. which provides the desired functionality to the portable electronic device 10, 20, 30, etc., and which bears a dock port connector 122 capable of interfacing with the device's connection port 16, 26, 36, can be chosen and installed within the dock connector insertion mouth 116. As examples, the dock connector portion 120, 140, 160, etc. may incorporate (or may incorporate a connection to) a printer, a memory/data storage device, a wired or wireless communication interface, a cabled/wired connection to other devices, etc. So long as the dock port connector 122 (FIGS. 1, 8) is situated on the chosen dock connector portion 120, 140, 160, etc. at the standard alignment location 124 when the chosen dock connector portion is fit within the dock receiver portion 102, the chosen portable electronic device 10, 20, 30, etc. and the chosen dock connector portion will directly interface. Thus, in summary, a user may install a selected sleeved portable electronic device 10, 20, 30, etc. within the device dock 100 to enhance the functionality of the chosen device, and further the functionality of the dock 100 may be varied as desired by selection of the appropriate dock connector portion 120, 140, 160, etc.

Figure 10:
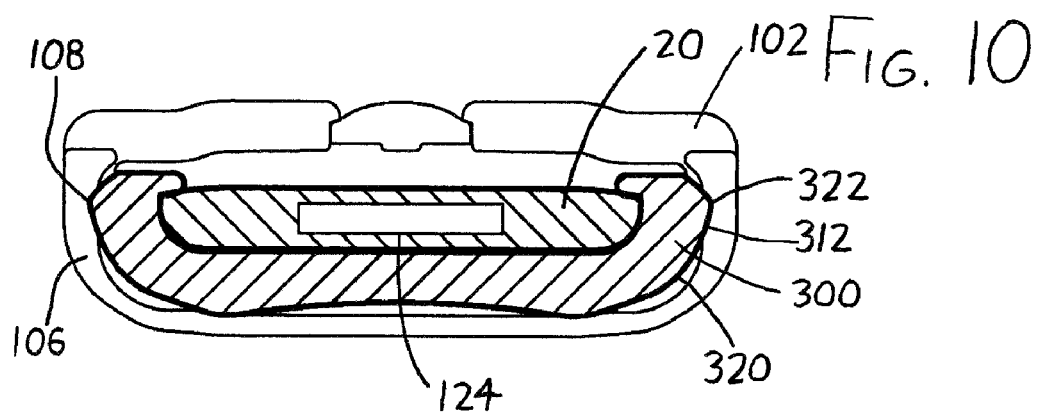
FIG. 10 is a cross-sectional view of the arrangement of FIG. 9, showing the portable electronic device 20 within the sleeve 300, and the sleeved device 20 in turn being within the dock receiver portion 102, with the ridge slots 108 in the lateral pocket walls 106 of the dock receiver portion 102 receiving ridges 322 on the outer sidewall faces 320 of the sleeve 300 to situate the connection port 26 (seen in FIG. 8) of the portable electronic device 20 at the standard alignment location 124 so that it is automatically aligned to directly interface with the dock port connector 122 of the dock connector portion 120 (FIG. 8).

As should be apparent from a review of FIGS. 5, 10, and 13, when a sleeved device 10, 20, 30, etc. is received within the dock receiver portion 102 of the dock 100, the sleeved device is restrained against any substantial displacement within the dock interior pocket 104, save for displacement into and out of the dock device insertion mouth 114 (seen in FIGS. 1 and 6). In other words, movement of the sleeved device 10, 20, 30, etc. along the axis of the device insertion mouth 114 is readily accomplished, but lateral movement is not. This arises in large part owing to the interfitting relationship between the pocket wall ridge slots 108 (see FIGS. 5, 10, and 13) and the sleeve ridges 222, 322, 422, which restrain the sleeves 200, 300, 400 with respect to the dock receiver portion 102 at spaced subsections of the circumferences of the sleeves 200, 300, 400. Other types of interfitting structures, and other locations for the interfitting structures, are possible, and the configuration, location, and number of interfitting structures can be varied from those shown. In any event, it has been found useful to have only portions of the circumferences of the sleeves 200, 300, 400 contact the pocket walls 106/110 of the dock interior pocket 104, with some spacing between other portions of the outer circumferences of the sleeves 200, 300, 400 and the pocket walls 106 and 110 of the pocket 104, to better avoid binding between the sleeves 200, 300, 400 and the pocket walls 106 and 110. Stated differently, it is useful to have the adjacent walls of the sleeves 200, 300, 400 and dock receiver portion 102 spaced apart, save for affirmatively fitting together at different locations, and/or along different axes, so as to more precisely align the device connection ports 16, 26, 36 of the sleeved devices 10, 20, 30 at the standard alignment location 124. This arrangement is particularly desired where the dock receiver portion 102 and/or the sleeves 200, 300, 400 are formed of plastic or other materials which are susceptible to thermal deformation and creep, since it is expected that the dock 100 and other components of the invention may be left in a vehicle over an extended period of time, and could therefore be subjected to higher than ambient temperatures for long periods of time.

Nevertheless, it is not necessary that the device sleeves 200, 300, 400 and the dock receiver portion 102 include spaced/distributed interfitting structures such as the sleeve ridges 222, 322, 422 and the ridge slots 108. The sleeves 200, 300, 400 could simply be configured to receive their portable electronic devices therein, and to adapt the outer boundaries of their portable electronic devices such that the sleeved devices complementarily fit within the dock interior pocket 104. In this respect, the different device sleeves 200, 300, 400 might have sleeve ridges 222, 322, 422 defined by the entireties of their sleeve sidewalls 212, 312, 412, with the sleeve sidewalls 212, 312, 412 being identically configured, such that any can fit within complementary ridge slots 108. In other words, sleeve ridges 222, 322, 422 can be defined by the entireties of the sleeve sidewalls 212, 312, 412, or by portions of the sleeve sidewalls 212, 312, 412. Further, the sleeve ridges 222, 322, 422 need not be "ridges," in the sense that they need not take the form of rails/flanges; rather, sleeve ridges might take the form of any structure suitable for complementarily sliding within the ridge slots 108, such as rods/pins, tabs, or other protrusions.

The sleeves 200, 300, and 400, the dock receiver portion 102, and at least the outer casings of the dock connector portions 120, 140, and 160 are preferably formed of plastic or metal, with molded plastic being particularly preferred owing to cost, weight, shock absorbance, and heat/electrical insulating properties. Depending on the material chosen, a sleeve 200 may need to be adapted so that its sleeve sidewalls 212 will flex outwardly to receive a portable electronic device 10 within the device insertion space 214 between the sidewalls 212. As seen in FIG. 5, a sleeve 200 may include a thinned portion 218 extending along its length which better allows the sleeve sidewalls 212 to flex apart, and then flex back together about the portable electronic device 10 after the device 10 is inserted therein.

Figure 17:
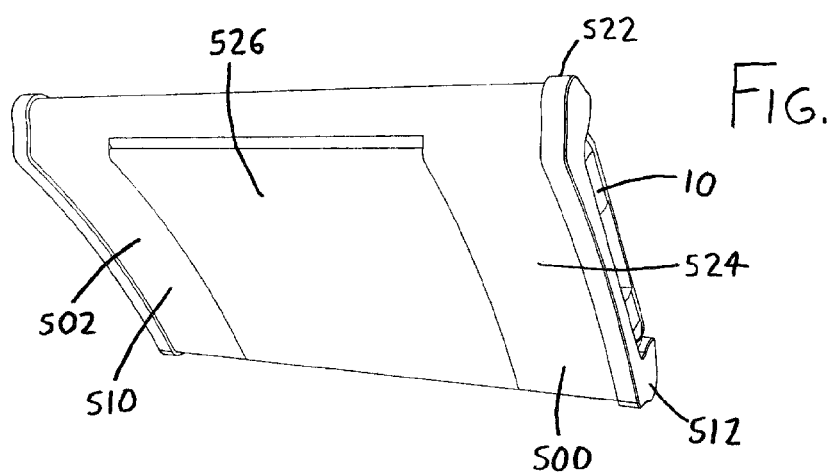
FIG. 17 is a perspective view of the rear sleeve side 510 of the device sleeve 500 of FIGS. 14-16, shown with the sleeve cover 550 of FIGS. 14-16 removed so that a sleeve stand 526 is visible in a state folded flush with the rear sleeve side 510.
Figure 18:
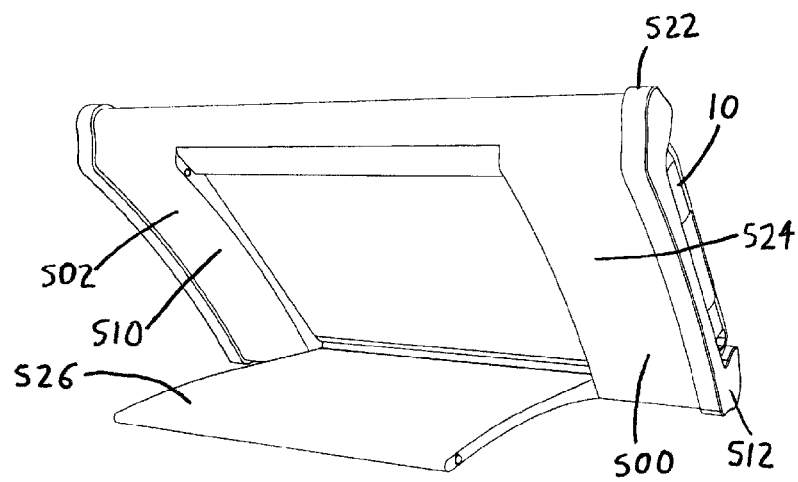
FIG. 18 shows the device sleeve 500 of FIG. 18 with the sleeve stand 526 shown unfolded so that the device sleeve 500 (and the portable electronic device 10 therein) is propped up for easier viewing by a user.
Figure 19:
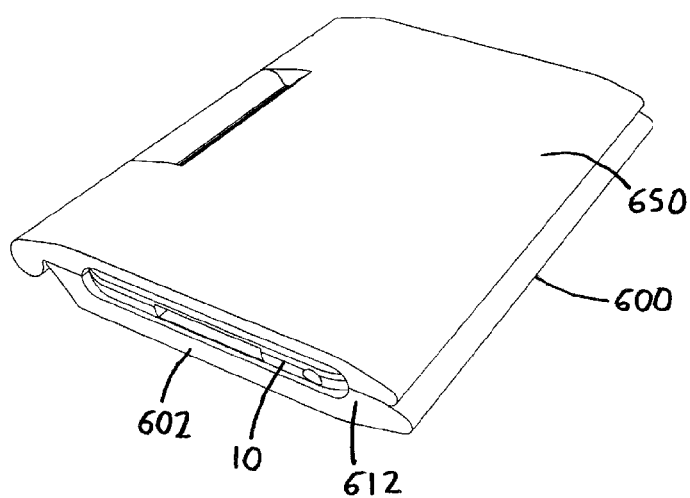
FIG. 19 is a perspective view of another exemplary device sleeve 600 with the portable electronic device 10 of FIG. 1 received therein, and with a sleeve cover 650—which is pivotally affixed to a sleeve sidewall 612—closed about the portable electronic device 10.
Figure 20:
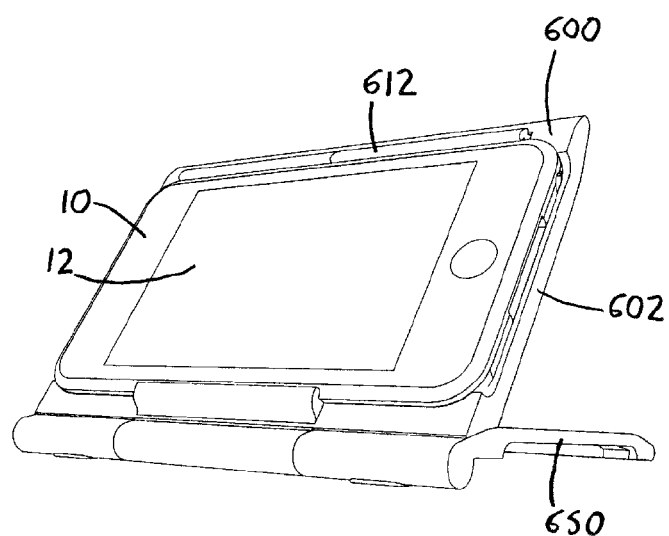
FIG. 20 is a perspective view of the device sleeve 600 of FIG. 19, shown with the sleeve cover 650 swung open to expose the front face 12 of the portable electronic device 10 for operation, and to have the sleeve cover 650 define a stand upon which the device sleeve 600 and portable electronic device 10 may rest.
Figure 21:
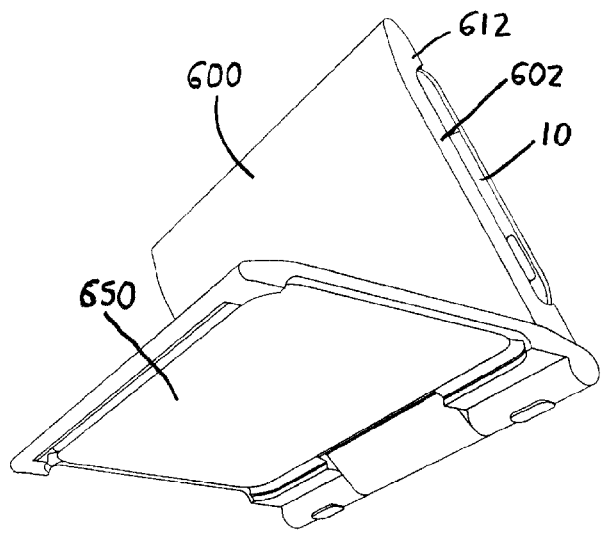
FIG. 21 presents the device sleeve 600 of FIG. 20 from another perspective.

Turning next to FIGS. 14-18, and also to FIGS. 19-21, the sleeves may take other forms, and may have other functionalities, than those thus far discussed. FIGS. 14-18 illustrate another exemplary device sleeve 500 which is configured to receive the portable electronic device 10 (again, an IPHONE 3G wireless telephone from Apple, Inc.). Here, the sleeve 500 has a resiliently flexible protective sleeve cover 550 (FIGS. 14-16) which complementarily fits within a sleeve cover pocket 524 (FIGS. 15 and 17-18) extending about the rear sleeve side 510 of the sleeve body 502, and about the opposing sleeve sidewalls 512 extending therefrom. The sleeve cover 550 may be removed from the pocket 524, as best seen by comparing FIGS. 14-15, and can be fit about the front sleeve side 508 such that its opposing sleeve cover sidewalls 560 fit about the sleeve sidewalls 512 to cover and protect the front face 12 of the portable electronic device 10 (see FIG. 16). The sleeve cover 550 can then be removed from the front sleeve side 508 and replaced in the sleeve cover pocket 524 when desired.

As then seen in FIGS. 17-18, the rear sleeve side 510 beneath the sleeve cover 550 may include a pivoting folddown stand 526 whereby a user may prop up his/her sleeved portable electronic device 10 for easier desktop viewing. Here the stand 526 is shown pivotally deploying about a rotational axis aligned along one of its sides, and aligned generally parallel to the sleeve sidewalls 512. However, the stand 526 could pivot about other axes, or could take other forms (e.g., thin fold-out legs which deploy in a variety of directions) to better allow the device sleeve 500 to be propped up at a desired angle.

The device sleeve 500 also includes sleeve ridges 522 which can allow the device sleeve 500, and any portable electronic device therein, to be received within a device dock (e.g., device dock 100 of FIG. 1) in such a manner that any connection port on the device is better positioned to interface with any port connector within the device dock (as discussed previously in relation to the device sleeves 200, 300, and 400). However, it should be understood that the sleeve 500, as depicted, is not configured to fit within the dock receiver portion 102 of the device dock 100 discussed previously, and that the dock receiver portion 102 (more specifically the inner circumference of the dock interior pocket 104 shown in FIGS. 5, 10, and 13) may need to be reconfigured to accommodate the sleeve 500. Conversely, the circumference of the sleeve 500 could be reconfigured to fit within the inner circumference of the dock receiver portion 102. The sleeve ridges 522, apart from possibly being configured for complementary engagement within ridge slots defined along the inner circumference of a dock receiver portion, also assist in retaining the sleeve cover 550 on the front sleeve side 508 (as in FIG. 14) or on the rear sleeve side 510 (as in FIG. 16) about the sleeve sidewalls 512. The sleeve cover 550 may be made of any suitable plastic, metal, or other material which allows it to flex, and to snap onto and off of the sleeve 500 in the manner shown.

Turning next to FIGS. 19-21, yet another device sleeve 600 is shown with the portable electronic device 10 fit therein. This device sleeve 600 has a sleeve body 602 with a pair of opposing sleeve sidewalls 612 arising therefrom (see particularly FIG. 20), wherein the sleeve sidewalls 612 are in the nature of retaining flanges which grip the edges of the portable electronic device 10 and hold it to the sleeve body 602. A sleeve cover 650 is then pivotally hinged to one of the sleeve sidewalls 612 so that the sleeve cover 650 may fold to cover the front face 12 of the portable electronic device 10 (as seen in FIG. 19), or may unfold away from the portable electronic device 10 to serve as a stand (as seen in FIGS. 20-21). Here too it should be understood that the outer circumference of the depicted sleeve cover 650 would need to be modified to fit within the inner circumference of the dock interior pocket 104 shown in FIGS. 5, 10, and 13, or conversely the inner circumference of the dock interior pocket 104 would need to be reconfigured to fit the outer circumference of the device sleeve 650. Further, when the sleeve cover 650 (as depicted) is closed, it will not allow the user's manipulation of control features on the front face 12 of the portable electronic device 10 unless one or more suitably sized and located apertures are formed in the sleeve cover 650. If an open aperture in the sleeve cover 650 is not desired, it may be closed with a thin film or the like which allows a user to manipulate controls on the portable electronic device 10 beneath the film.

Referring back to FIGS. 1-3, the dock connector portions 120, 140, 160, etc. are partially (or entirely) complementarily received within the dock connector insertion mouth 116 (seen in FIGS. 1 and 3), and the dock connector portions 120, 140, 160, etc. and/or the receiver portion 102 preferably include some form of locking means for releasably holding an installed dock connector portion 120, 140, 160, etc. within the insertion mouth 116. One version of this arrangement can be seen in FIGS. 1-3, wherein the dock connector portion 120 includes a dock connector portion button 132 which may be spring-loaded or otherwise elastically biased to protrude outwardly from the dock connector portion 120. This dock connector portion button 132 depresses/retracts when the dock connector portion 120 is inserted within the dock connector insertion mouth 116, and as insertion proceeds, the dock connector portion button 132 springs back outwardly into a space situated underneath a dock receiver portion button 118 (seen in FIGS. 1 and 3). The dock receiver portion button 118 is flexible/deformable, and is formed in a dome-like shape whereby a user may depress it to thereby depress the dock connector portion button 132 beneath, such that the dock connector portion 120 may be withdrawn from the dock connector insertion mouth 116. Otherwise, if not depressed, the dock connector portion button 132 may spring upwardly to fit within the button 118, thereby effectively engaging the dock connector portion 120 to the dock receiver portion 102. A wide variety of other locking means could be used instead of this arrangement, including a wide variety of different elastically-biased structures (e.g., tongues, buttons, etc.) which are elastically biased from one of the dock connector portion 120 and the dock receiver portion 102 to at least partially fit within a receiving depression in the other portion 102/120. Simple frictionally-fitting arrangements, mechanical latches, or other locking means are also or alternatively available to (preferably removably) affix the dock connector portion 120 within the dock receiver portion 102.

Device docks may take a variety of different forms apart from those discussed previously, and turning to FIGS. 22-23, the sleeved portable electronic device 10 is shown (twice, at different orientations) with a variety of different device docks, including device dock 100 and device docks 1200, 1300, 1400, 1500, 1600, 1700, 1800, and 1900. Each of the new device docks will now be discussed in turn.

Device dock 1200 is illustrated with a dock receiver portion 1202, but without any dock connector portion. Any suitable dock connector portion, such as the dock connector portions 120, 140, and 160 of FIG. 1, may be installed within its dock connector insertion mouth 1216 (seen in FIG. 23). Device dock 1200 has a form similar to the device dock 100 of FIGS. 1-6 and 8-13, but its dock receiver portion 1202 has a rear face bearing clamps 1220 which are adapted to fold about and receive a round bar (such has the handlebars of a bicycle), and to be tightened and locked thereon. A user may therefore use the device dock 1200 to mount a portable electronic device to a bicycle or the like, with the device dock 1200 being affixed to handlebars or a bicycle frame strut. A suitable dock connector portion (e.g., dock connector portions 120, 140, 160 of FIG. 1) may be installed in the dock connector insertion mouth 1216, and the sleeved portable electronic device (e.g., the sleeved portable electronic device 10) may be received within the device insertion mouth 1214 (FIG. 22) to interface with the dock connector portion.

Figure 22:
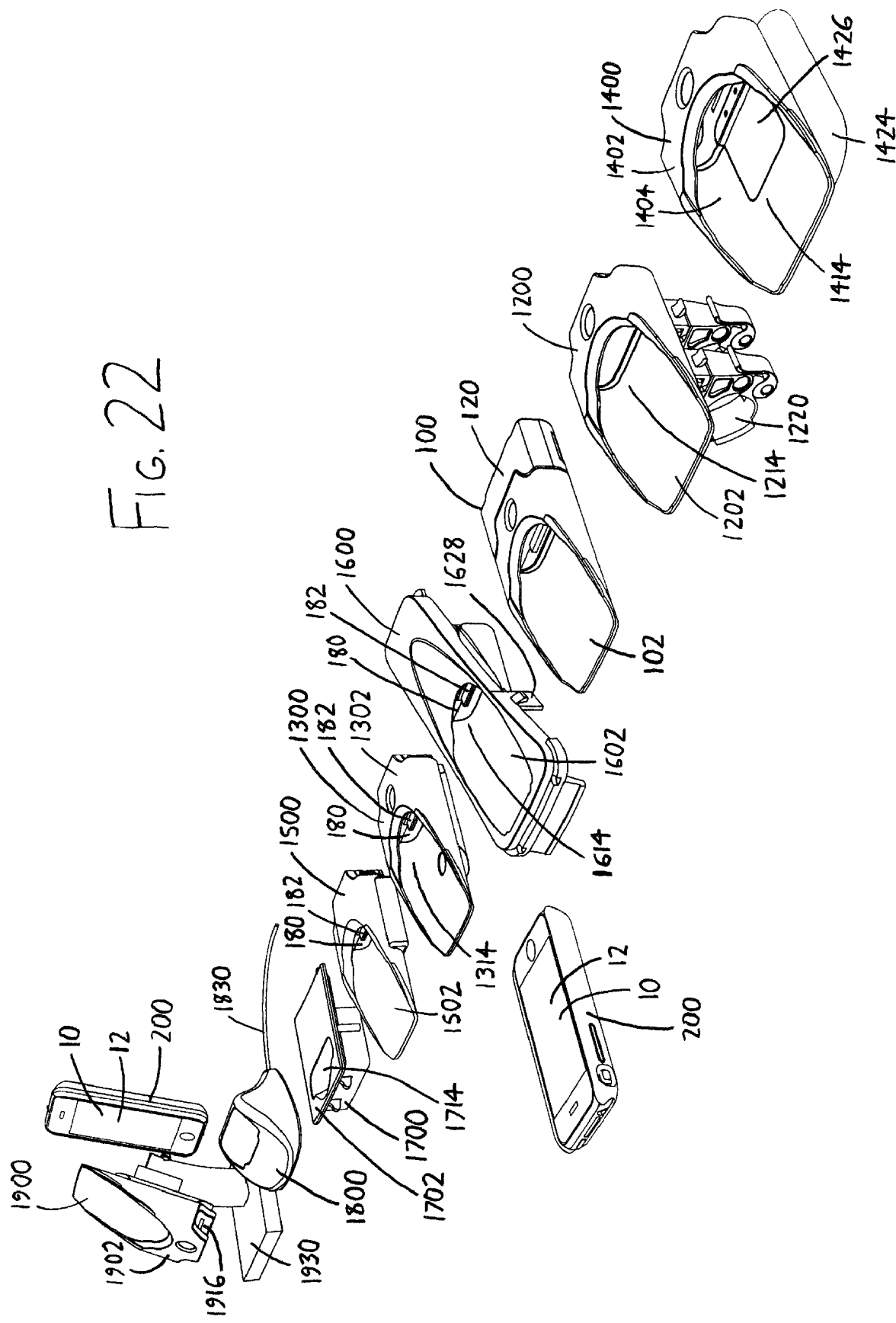
FIG. 22 presents a top perspective view of the portable electronic device 10 (actually shown twice, at different orientations) in combination with the device dock 100 and with exemplary alternative device docks 1200, 1300, 1400, 1500, 1600, 1700, 1800, and 1900.
Figure 23:
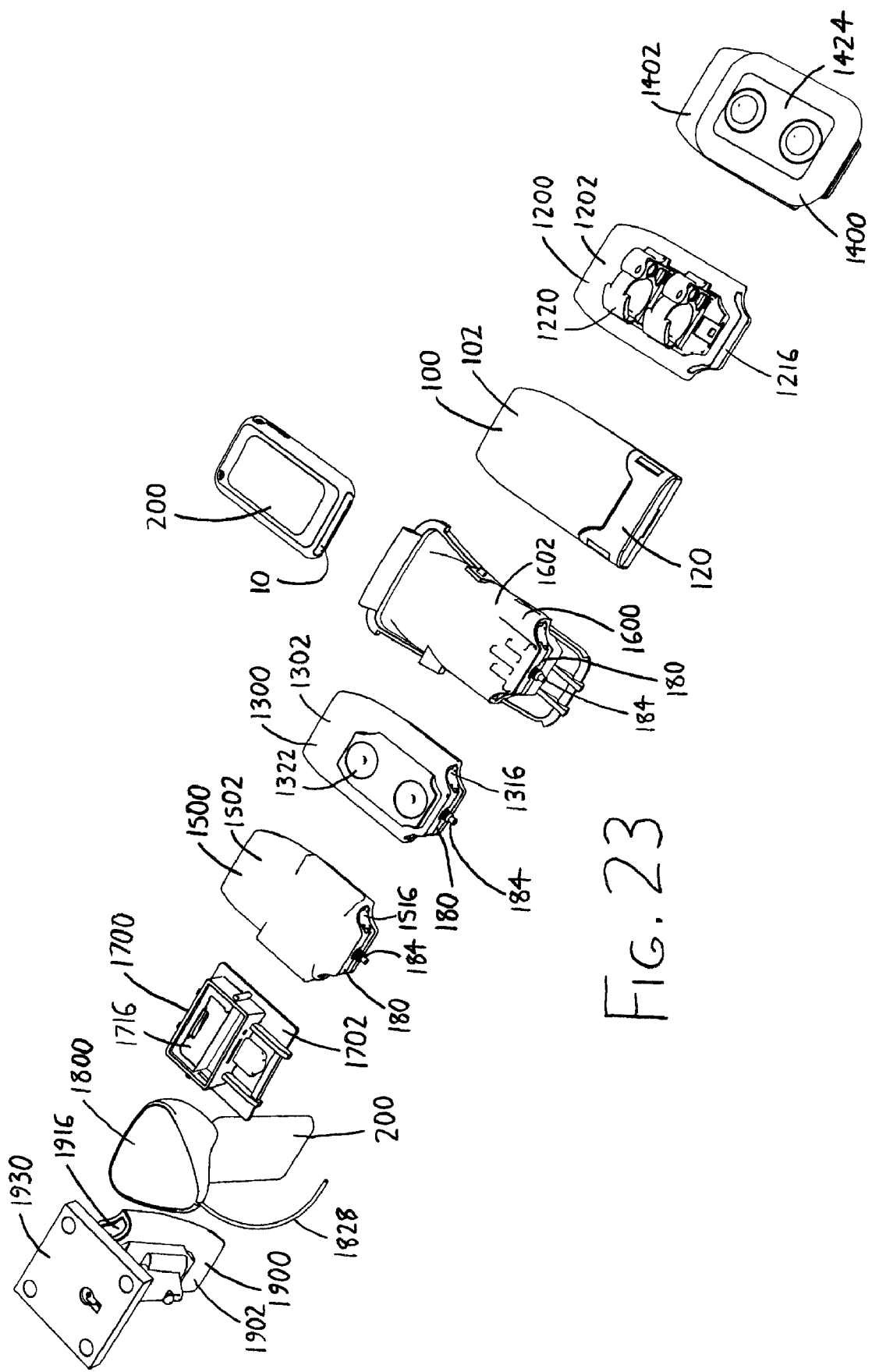
FIG. 23 presents a bottom perspective view of the portable electronic device 10 and device docks 100, 1200, 1300, 1400, 1500, 1600, 1700, 1800, and 1900 of FIG. 22.

As can best be seen in FIG. 23, device dock 1300 has a dock connector portion 180 installed within the connector insertion mouth 1316 of its dock receiver portion 1302, and this dock connector portion 180 interfaces with the sleeved portable electronic device 10 when the device 10 is inserted within the device insertion mouth 1314 (FIG. 22) of the dock receiver portion 1302. The dock receiver portion 1302 of the device dock 1300 is also configured substantially similarly to the dock receiver portion 102 discussed previously, but its rear side bears a plate having suction cups 1322, thereby allowing the device dock 1300 to be temporarily affixed to a windshield or other smooth surface. These suction cups 1322 could be replaced with carpet augers (screws commonly used in the auto industry to fasten mats to the carpet of a car) to allow mounting of the device dock 1300 to (for example) the transmission hump next to the shifter, or with double-sided tape to allow mounting of the device dock 1300 to (for example) the underside of a center console compartment flip-up lid, or with other mounting means for allowing attachment of the device dock 1300 to standard automotive structures. The dock connector portion 180 received within the connector insertion mouth 1316 (FIG. 23) is similar to the dock connector portion 140 of FIG. 1, but it has an interface cable 1324 extending therefrom. This interface cable 1324 can extend for some desired length to terminate at some suitable connector (e.g., an RCA or USB connector), whereas the port connector 182 (FIG. 22) within the device insertion mouth 1314 may take the form of a 30-pin or other connector suitable for interfacing with the sleeved portable electronic device 10. Thus, the device dock 1300 allows a user to (for example) mount a sleeved portable electronic device 10 within a vehicle, and interface the device 10 with the vehicle's stereo system. Other uses are possible, and the device dock 1300 could be situated on other surfaces for interfacing with other devices (e.g., the device dock 1300 could be situated on the surface of a kitchen appliance for interfacing with a nearby computer or stereo system).

The device dock 1400 of FIGS. 22-23 is similar to the device dock 1300, with the dock receiver portion 1402 having a suction cup base 1424 allowing mounting to a suitable smooth surface. The suction cup base 1424 is affixed to a pivoting portion 1426 situated on the rear wall of the dock interior pocket 1404, and this pivoting portion 1426 may pivot with respect to the remainder of the dock receiver portion 1402. A user may therefore insert a sleeved portable electronic device 10 within the device insertion mouth 1414 of the dock interior pocket 1404 to interface with a suitable dock connector portion (not shown), with the dock receiver portion 1402 being adjusted at some desired angle with respect to the suction cup base 1424 and the mounting surface to which it is affixed. The base 1424 may include mounting means other than or in addition to suction cups, such as carpet augers, double-sided tape, gel/putty clinging surfaces, clamps, etc. Preferably, the dock receiver portion 1402 and its pivoting portion 1426 are also detachable with respect to the suction cup base 1424, allowing a user to detach the dock receiver portion 1402 from the suction cup base 1424 and reattach it when desired.

The device dock 1500 of FIGS. 22-23 also has a dock receiver portion 1502 which is similar to the dock receiver portion 102 of the device dock 100, but here the dock receiver portion 1502 is specially configured for having its rear surface flush-mounted to some planar surface. As with the device dock 1300, a dock connector portion 180 is shown installed within the connector insertion mouth 1516 (FIG. 23), and it includes an interface cable 184 and a dock port connector 182 (FIG. 22) for interfacing with the sleeved portable electronic device 10.

The device dock 1600 has a dock receiver portion 1602 which is configured somewhat similarly to the dock receiver portions discussed previously, but here the exterior of the dock receiver portion 1602 is specially configured to fit within a pocket formed within the center console of a car (the console between the driver and front passenger seats). The dock receiver portion 1602 caps such a pocket, thereby adapting the entire pocket into a device dock such that a user can insert a sleeved portable electronic device 10 into the device insertion mouth 1614 (FIG. 22) within the pocket. A variety of flanges/latches 1628 or other means for attaching the dock receiver portion 1602 in the pocket can be situated about the dock receiver portion 1602. Here too the device dock 1600 is illustrated with a dock connector portion 180 installed within its connector insertion mouth 1616 (FIG. 23), with the dock connector portion 180 including a dock port connector 182 (FIG. 22) and an interface cable 184 (FIG. 23). The cable 184 may extend within the pocket in the car's console to interface with the car's stereo system, such that the cable is entirely masked beneath the dock receiver portion 1602 and the interior molding/trim surfaces of the car. This avoids a problem with prior aftermarket docks wherein the docks are obtrusively mounted on flexible stalks, or to car air vent louvers and the like, and their cables openly extend without protection to interface with the stereo at a jack in the glove compartment or elsewhere. Such exposed cables are prone to being caught on passengers or objects within the car, and to being pulled, which can damage the docks, their portable electronic devices, and/or the car's interface. Such docks are also far more prone to theft, requiring a user to remove them from a car when leaving the car and reinstall them upon returning, which can be annoying.

The device dock 1700 is similar to the device dock 1600 insofar as it is specially configured to be fit within an aperture in a car console, here the aperture left when an ashtray (or ashtray console) is pulled from the car. The sleeved portable electronic device 10 is inserted within the device insertion mouth 1714 (FIG. 22) to interface with a dock connector portion (not shown) installed behind/beneath the dock receiver portion 1702. A suitable dock connector portion is installed within the dock connector insertion mouth 1716 (FIG. 23) such that the dock connector portion is effectively obscured behind the dock receiver portion 1702 when the dock receiver portion 1702 is installed in the ashtray aperture. Here too cables or other leads may extend from/behind, and be masked by, the dock receiver portion 1702, and these may interface with the car's stereo system or other electronics.

The device dock 1800 is a "dedicated" dock, i.e., it does not utilize a removable/replaceable dock connector portion, and rather simply receives a sleeved portable electronic device 10 to interface with a cable 1830. This cable 1830 may terminate in a USB or other connector for connection to a personal computer or other device. It is also possible that the cable 1830 terminates in multiple connectors, e.g., it may branch to terminate in a USB connector along one branch, a ⅛ inch stereo jack on another branch, and so forth.

The device dock 1900 also resembles the device dock 100 discussed earlier, having a dock receiver portion 1902 adapted to receive any suitable dock connector portion (e.g., dock connector portions 120, 140, 160, 180, etc.) within its connector insertion mouth 1916. The dock receiver portion 1902 is then pivotally/adjustably mounted on a stand 1930, allowing a user to adjust the height and angle of any portable electronic device 10 installed within the device dock 1900. The device dock 1900 is similar to the device dock 1800 in that it allows the user to interface a portable electronic device 10 with a personal computer or other device, but it has greater versatility than the device dock 1800 insofar as it may accommodate a variety of different dock connector portions as desired, and it also allows the portable electronic device 10 to be positioned as desired.

Referring back to FIGS. 1-3 and the dock connector portions 120, 140, and 160 therein (as well as the dock connector portion 180 illustrated in FIGS. 22-23), these (or other) dock connector portions may have their functional components and outer casings specially manufactured to be installed within dock receiver portions such as those discussed previously. However, as alluded to earlier, a preferred approach is to have the outer casings of the dock connector portions manufactured in sections, as with the sections 126a and 126b of the dock connector portion 120 of FIGS. 2-3, with a suitably configured cavity 128 defined therein for allowing insertion of a pre-manufactured, off-the-shelf standalone device (e.g., the standalone device 50 of FIGS. 2 and 3). One or more openings 130 may be defined in one or more of the dock connector sections 126a and 126b through which the port connector 122, and/or any functional portions of the standalone device 50 (e.g., input/output ports/cables, controls, etc.), may extend or be revealed for access. Various types of inserts may then be formed to complementarily fit within the sections 126a and 126b around the inserted standalone device 50 such that these inserts properly locate the port connector 122 protruding from the opening 130 so that the connector 122 is situated at the standard alignment location 124 (FIGS. 5, 10, 13). The inserts thus "pack" the interior of the dock connector portion sections 126a and 126b such that the selected standalone device 50 is firmly held therein, with an appropriately-aligned port connector 122 protruding from the opening 130. Where the dock connector portion sections 126a and 126b are formed with a number of openings 130 to accommodate interface cables or other leads extending from the selected standalone device 50, and/or to allow a user to access controls, ports, etc. provided on the selected standalone device 50, any openings which are not of use for the selected standalone device 50 can be plugged by the inserts. By taking this approach, a manufacturer of dock connector portions need not specially manufacture a large variety of different dock connector portions. Instead, the manufacturer can simply manufacture one or more different dock connector sections 126a and 126b which can each accommodate several different standalone devices, with openings 130 situated to accommodate the inputs/outputs of the various standalone devices, and with a variety of inserts wherein different inserts (or sets of inserts) are each configured to appropriately pack a specific one of the standalone devices within the dock connector sections 126a and 126b. When a manufacturer wishes to incorporate a new standalone device within a dock connector portion, he/she can then simply take dock connector portions 126a and 126b which are sized such that they can receive the standalone device, and which have openings 130 which are appropriately sized and situated to accommodate the inputs/outputs of the standalone device, and can form inserts which allow the standalone device to be tightly fit within the dock connector portions 126a and 126b with the port connector of the standalone device aligned at the standard alignment location 124 (FIGS. 5, 10, 13). Thus, standard off-the-shelf data storage/memory devices, power supplies, wireless communicators, interface cables, etc. can be entirely or partially encased within the dock connector portions 126a and 126b so that they may subsequently be installed within a dock receiver portion 102.

When discussing portable electronic devices, this document has generally referred to devices made by Apple, Inc., e.g., the IPHONE 10, IPOD NANO 20, and IPOD CLASSIC 30 discussed earlier. These devices are useful for sake of discussion because they illustrate a family of differently-configured devices which all utilize generally the same types of device connection ports 16, 26, and 36 (30-pin female connectors) for input and/or output of power and/or communications (though such ports are at different locations on the devices), and thus the same dock port connectors 122, 182, etc. (30-pin male connectors) are shown. However, it should be understood that other types of portable electronic devices from other manufacturers, and using other types of device connection ports, can be used instead. In this case, the dock connector portion 120, 140, 160, etc. is simply configured to provide the appropriate dock port connector at the standard alignment location 124 defined by the portable electronic device in question, and by the device sleeve fitting the portable electronic device within the dock receiver portion 102, 1202, 1302, etc. in question.

Various preferred versions of the invention have been shown and described above to illustrate possible forms and features that the invention might assume. However, it should be understood that the invention can assume different forms such that it appears quite different from those forms depicted in the drawings. Further, the invention can incorporate additional features, or can have fewer features than those discussed previously. Features can also be comingled, e.g., features of each of the sleeves 200, 300, 400, 500, etc. discussed previously could be incorporated into any of the other sleeves as well. It is therefore emphasized that the invention is not intended to be limited to the preferred versions of the invention described above, but rather is intended to be limited only by the claims set out below. Thus, the invention encompasses all different versions that fall literally or equivalently within the scope of these claims.

What is claimed is:

1. A docking system for a first portable electronic device having a device connection port thereon, the docking system including:
   a. a device dock having a dock interior pocket:
      (1) with a dock port connector therein, the dock port connector being configured to directly interface with the device connection port of the first portable electronic device when the device connection port and dock port connector are engaged together;
      (2) bounded by pocket walls wherein the dock interior pocket is configured to loosely receive the first portable electronic device between the pocket walls when inserted within the dock interior pocket, such that when the first portable electronic device is inserted within the dock interior pocket in abutment with at least one of the pocket walls, the device connection port of the first portable electronic device cannot directly interface with the dock port connector;
      (3) wherein the device dock includes:
         (a) a dock receiver portion having the dock interior pocket therein, and
         (b) a dock connector portion having the dock port connector thereon,
         wherein the dock connector portion is removably engaged to the dock receiver portion;
   b. a first device sleeve configured to:
      (1) extend about a portion of the exterior of the first portable electronic device to:
         (a) removably engage the first portable electronic device within the first device sleeve, while
         (b) leaving the device connection port exposed;
      (2) abut at least a portion of the pocket walls when the first device sleeve is received within the dock interior pocket, and
      (3) guide the device connection port of the first portable electronic device to directly interface with the dock port connector of the device dock when the first device sleeve, with the first portable electronic device engaged therein, is fully received within the dock interior pocket.

2. The docking system of claim 1 wherein portions of the pocket walls on opposing sides of the dock interior pocket complementarily engage opposing sides of the first device sleeve when the first device sleeve is received within the dock interior pocket.

3. The docking system of claim 1 wherein the dock connector portion is removably engaged to the dock receiver portion within the dock interior pocket.

4. The docking system of claim 1 wherein:
a. the dock port connector extends from a standalone device situated within the dock connector portion, and
b. the standalone device includes one or more of:
   (1) a power supply;
   (2) a wireless receiver and/or transmitter;
   (3) a memory; and
   (4) a terminal connector and attached interface cable.

5. The docking system of claim 4 wherein:
a. the dock connector portion is formed in two or more dock connector portion sections,
b. the dock connector portion sections are connected about the standalone device to enclose the standalone device therein,
c. the connected dock connector portion sections define an opening through which the dock port connector extends, whereby the dock port connector is exposed on the dock connector portion.

6. The docking system of claim 1 wherein the dock interior pocket defines an internal passage within the dock receiver portion, with the dock interior pocket extending between:
a. a dock device insertion mouth into which the first device sleeve is received,
b. a dock connector insertion mouth spaced from the device insertion mouth, wherein the dock connector portion is removably engaged within the dock connector insertion mouth.

7. The docking system of claim 1 wherein:
a. the first device sleeve has opposing sleeve sidewalls bearing sleeve ridges thereon,
b. the dock interior pocket has opposing pocket walls with ridge slots defined therein, and
c. the sleeve ridges engage within the ridge slots when the first device sleeve is received within the dock interior pocket, with the sleeve ridges and ridge slots guiding the device connection port of the first portable electronic device to directly interface with the dock port connector of the device dock.

8. The docking system of claim 7 wherein the first device sleeve, when fully received within the dock interior pocket with the first portable electronic device engaged within the first device sleeve, has at least a major portion of the outer circumference of the first device sleeve spaced from the pocket walls.

9. The docking system of claim 1 further including a sleeve cover having:
a. a cover body,
b. a pair of opposing cover sidewalls extending outwardly from opposite sides of the cover body, and
c. a sleeve insertion space defined between the opposing cover sidewalls and adjacent the cover body,
the sleeve cover being configured to receive the sleeve within the sleeve insertion space with the opposing cover sidewalls removably engaging the sleeve therein.

10. The docking system of claim 9 wherein the cover body includes a clip thereon.

11. The docking system of claim 1 in combination with a second device sleeve configured to:
a. extend about a portion of the exterior of a second portable electronic device, the second portable electronic device having a device connection port thereon, to:
   (1) removably engage the second portable electronic device within the second device sleeve, while
   (2) leaving the device connection port of the second portable electronic device exposed;
b. abut at least a portion of the pocket walls when the second device sleeve is received within the dock interior pocket, and
c. guide the device connection port of the second portable electronic device to directly interface with the dock port connector of the device dock when the second device sleeve, with the second portable electronic device engaged therein, is fully received within the dock interior pocket,
wherein:
(1) the second portable electronic device has an exterior surface configured differently from the exterior surface of the first portable electronic device, and
(2) the second device sleeve cannot receive the first portable electronic device therein, and
(3) the first device sleeve cannot receive the second portable electronic device therein.

12. The docking system of claim 1, wherein the first device sleeve includes a sleeve body having:
a. opposing top and bottom sleeve sides,
b. opposing lateral sleeve sidewalls extending between the top and bottom sleeve sides, wherein:
   (1) the sleeve sidewalls extend outwardly from the sleeve body to define a device insertion space between the sleeve sidewalls and adjacent the sleeve body,
   (2) the sleeve sidewalls include inner sidewall faces facing inwardly toward each other across the device insertion space, the inner sidewall faces being concave, and
   (3) the sleeve sidewalls include outer sidewall faces opposite their inner sidewall faces, the outer sidewall faces each including a sleeve ridge thereon extending in a direction between the top and bottom sleeve sides; and
c. opposing front and rear sleeve sides situated between the top and bottom sleeve sides and between the sleeve sidewalls,
wherein the first portable electronic device may rest within the device insertion space with edges of the first portable electronic device received within the concave inner sidewall faces, and with the device connection port being unobstructed by the first device sleeve.

13. The docking system of claim 12, wherein:
a. the pocket walls include ridge slots defined therein, whereby the first device sleeve may be received within the dock interior pocket with the sleeve ridges fit within the ridge slots,
b. the dock interior pocket is bounded by front and rear pocket walls situated between the lateral pocket walls, and
c. the first device sleeve, when fully received within the dock interior pocket with the sleeve ridges fit within the ridge slots, has at least a major portion of at least one of:
   (1) the front sleeve side spaced from the front pocket wall, and
   (2) the rear sleeve side spaced from the rear pocket wall, with any portable electronic device within the device insertion space of the first device sleeve having its device connection port directly interfaced with the dock port connector.

14. The docking system of claim 1, wherein:
a. the first device sleeve includes a sleeve body having:
   (1) opposing top and bottom sleeve sides; and
   (2) opposing lateral sleeve sidewalls extending between the top and bottom sleeve sides, and b. wherein the sleeve body is thinner at a location:
  (1) spaced at least substantially halfway between the sleeve sidewalls, and
  (2) extending between the top and bottom sleeve sides.

15. The docking system of claim 1, wherein the first device sleeve includes a sleeve body having:
  a. opposing top and bottom sleeve sides, and
  b. opposing lateral sleeve sidewalls extending between the top and bottom sleeve sides, wherein the sleeve sidewalls:
    (1) extend outwardly from the sleeve body to define a device insertion space between the sleeve sidewalls and adjacent the sleeve body,
    (2) include inner sidewall faces facing inwardly toward each other across the device insertion space, the inner sidewall faces being concave, and
    (3) are spaced at least substantially uniformly away from each other save for at the top and bottom sleeve sides, where the sleeve sidewalls extend inwardly toward each other,
  whereby a channel is defined between the sleeve sidewalls and adjacent the sleeve body, the channel being narrower at the top and bottom sleeve sides and broader therebetween.

16. The docking system of claim 15, wherein the sleeve body is thinner at a location:
  a. spaced at least substantially halfway between the sleeve sidewalls, and
  b. extending between the top and bottom sleeve sides.

17. The docking system of claim 16 wherein:
  a. the sleeve sidewalls extend outwardly from the sleeve body between a rear sleeve side and a front sleeve side,
  b. the sleeve sidewalls include outer sidewall faces opposite their inner sidewall faces, and
  c. the outer sidewall faces each include a sleeve ridge thereon extending in a direction between the top and bottom sleeve sides, the sleeve ridge being spaced closer to the front sleeve side than the rear sleeve side.

18. The docking system of claim 17 wherein:
  a. the dock interior pocket has opposing pocket walls with ridge slots defined therein, and
  b. the sleeve ridges of the outer sidewall faces engage within the ridge slots when the first device sleeve is received within the dock interior pocket, with the sleeve ridges and ridge slots guiding the device connection port of the first portable electronic device to directly interface with the dock port connector of the device dock.

19. The docking system of claim 17 further including a sleeve cover having:
  a. a cover body,
  b. opposing top and bottom cover sides, and
  c. opposing lateral cover sidewalls extending between the top and bottom cover sides, wherein the cover sidewalls:
    (1) extend outwardly from the cover body to define a sleeve insertion space between the cover sidewalls and adjacent the cover body,
    (2) include inner sidewall faces facing inwardly toward each other across the sleeve insertion space, the inner sidewall faces being concave,
  the sleeve cover being configured to receive the sleeve within the sleeve insertion space with the sleeve ridges being received within the concave inner sidewall faces of the cover sidewalls.

20. A docking system for a first portable electronic device having a device connection port thereon, the docking system including:
  a. a device dock having a dock interior pocket:
    (1) with a dock port connector therein, the dock port connector being configured to directly interface with the device connection port of the first portable electronic device when the device connection port and dock port connector are engaged together;
    (2) bounded by pocket walls wherein the dock interior pocket is configured to loosely receive the first portable electronic device between the pocket walls when inserted within the dock interior pocket, such that when the first portable electronic device is inserted within the dock interior pocket in abutment with at least one of the pocket walls, the device connection port of the first portable electronic device cannot directly interface with the dock port connector;
  b. a first device sleeve configured to:
    (1) extend about a portion of the exterior of the first portable electronic device to:
      (a) removably engage the first portable electronic device within the first device sleeve, while
      (b) leaving the device connection port exposed;
    (2) abut at least a portion of the pocket walls when the first device sleeve is received within the dock interior pocket, and
    (3) guide the device connection port of the first portable electronic device to directly interface with the dock port connector of the device dock when the first device sleeve, with the first portable electronic device engaged therein, is fully received within the dock interior pocket;
  wherein the first device sleeve includes a sleeve body having:
    (1) opposing top and bottom sleeve sides, and
    (2) opposing lateral sleeve sidewalls extending between the top and bottom sleeve sides, wherein the sleeve sidewalls:
      (a) extend outwardly from the sleeve body to define a device insertion space between the sleeve sidewalls and adjacent the sleeve body,
      (b) include inner sidewall faces facing inwardly toward each other across the device insertion space, the inner sidewall faces being concave, and
      (c) are spaced at least substantially uniformly away from each other save for at the top and bottom sleeve sides, where the sleeve sidewalls extend inwardly toward each other,
    whereby a channel is defined between the sleeve sidewalls and adjacent the sleeve body, the channel being narrower at the top and bottom sleeve sides and broader therebetween;
  wherein the sleeve body is thinner at a location:
    i. spaced at least substantially halfway between the sleeve sidewalls, and
    ii. extending between the top and bottom sleeve sides.

21. The docking system of claim 20 wherein:
  a. the sleeve sidewalls extend outwardly from the sleeve body between a rear sleeve side and a front sleeve side,
  b. the sleeve sidewalls include outer sidewall faces opposite their inner sidewall faces, and
  c. the outer sidewall faces each include a sleeve ridge thereon extending in a direction between the top and bottom sleeve sides, the sleeve ridge being spaced closer to the front sleeve side than the rear sleeve side.

22. The docking system of claim 21 wherein:
  a. the dock interior pocket has opposing pocket walls with ridge slots defined therein, and b. the sleeve ridges of the outer sidewall faces engage within the ridge slots when the first device sleeve is received within the dock interior pocket, with the sleeve ridges and ridge slots guiding the device connection port of the first portable electronic device to directly interface with the dock port connector of the device dock.

23. The docking system of claim 21 further including a sleeve cover having:
   a. a cover body,
   b. opposing top and bottom cover sides, and
   c. opposing lateral cover sidewalls extending between the top and bottom cover sides, wherein the cover sidewalls:
      (1) extend outwardly from the cover body to define a sleeve insertion space between the cover sidewalls and adjacent the cover body,
      (2) include inner sidewall faces facing inwardly toward each other across the sleeve insertion space, the inner sidewall faces being concave,
   the sleeve cover being configured to receive the sleeve within the sleeve insertion space with the sleeve ridges being received within the concave inner sidewall faces of the cover sidewalls.

24. The docking system of claim 23 wherein the cover body includes a clip thereon.

25. A docking system for a portable electronic device having a device connection port thereon, the docking system including:
   a. a device sleeve configured to:
      (1) removably engage the portable electronic device within the device sleeve;
      (2) extend about a portion of the exterior of the portable electronic device to leave the device connection port exposed, and
   b. a device dock having a dock interior pocket:
      (1) configured to receive the device sleeve therein,
      (2) with a dock port connector therein, the dock port connector being configured to directly interface with the device connection port of the portable electronic device;
   wherein the device dock includes:
      (i) dock receiver portion having the dock interior pocket therein, and
      (ii) a dock connector portion having the dock port connector thereon, wherein the dock connector portion is removably engaged to the dock receiver portion;
   wherein the device connection port of the portable electronic device directly interfaces with the dock port connector of the device dock when the device sleeve, with the portable electronic device therein, is fully inserted within the dock interior pocket.

26. The docking system of claim 25 wherein:
   a. the dock interior pocket is bounded by pocket walls, with at least a portion of the pocket walls:
      (1) abutting at least a portion of the device sleeve when the device sleeve is received within the dock interior pocket, and
      (2) guiding the device connection port of the portable electronic device to directly interface with the dock port connector of the device dock when the device sleeve, with the portable electronic device therein, is inserted within the dock interior pocket;
   b. when the portable electronic device is inserted within the dock interior pocket:
      (1) without the device sleeve, and
      (2) in abutment with at least one of the pocket walls,
   the device connection port of the portable electronic device cannot directly interface with the dock port connector of the device dock.

27. The docking system of claim 25 wherein:
   a. the device sleeve has opposing sleeve sidewalls, and
   b. the dock interior pocket has opposing pocket walls, and
   c. the opposing sleeve sidewalls complementarily engage the opposing pocket walls when the device sleeve is inserted within the dock interior pocket.

28. The docking system of claim 25 wherein:
   a. the device sleeve has opposing sleeve sidewalls bearing sleeve ridges thereon, and
   b. the dock interior pocket has opposing pocket walls with ridge slots defined therein, and
   c. the opposing sleeve sidewalls complementarily engage the opposing pocket walls with the sleeve ridges engaged within the ridge slots when the device sleeve is inserted within the dock interior pocket,
   whereby the sleeve ridges and ridge slots guide the device connection port of the portable electronic device to directly interface with the dock port connector of the device dock when the device sleeve, with the portable electronic device therein, is inserted within the dock interior pocket.

29. The docking system of claim 25 wherein the dock connector portion is removably engaged to the dock receiver portion within the dock interior pocket.

30. The docking system of claim 25 wherein the dock receiver portion includes an internal passage extending between:
   a. a dock device insertion mouth into which the device sleeve is received,
   b. a dock connector insertion mouth spaced from the device insertion mouth, wherein the dock connector portion is removably engaged within the dock connector insertion mouth,
   wherein the dock interior pocket defines at least a portion of the internal passage.

31. The docking system of claim 25, wherein the device sleeve includes a sleeve body having:
   a. opposing top and bottom sleeve sides,
   b. opposing lateral sleeve sidewalls extending between the top and bottom sleeve sides, wherein:
      (1) the sleeve sidewalls extend outwardly from the sleeve body to define a device insertion space between the sleeve sidewalls and adjacent the sleeve body,
      (2) the sleeve sidewalls include inner sidewall faces facing inwardly toward each other across the device insertion space, the inner sidewall faces being concave, and
      (3) the sleeve sidewalls include outer sidewall faces opposite their inner sidewall faces, the outer sidewall faces each including a sleeve ridge thereon extending in a direction between the top and bottom sleeve sides; and
   c. opposing front and rear sleeve sides situated between the top and bottom sleeve sides and between the sleeve sidewalls,
   wherein the portable electronic device may rest within the device insertion space with edges of the portable electronic device received within the concave inner sidewall faces, and with the device connection port being unobstructed by the device sleeve.

32. The docking system of claim 31, wherein:
a. the pocket walls include ridge slots defined therein, whereby the first device sleeve may be received within the dock interior pocket with the sleeve ridges fit within the ridge slots,
b. the dock interior pocket is bounded by front and rear pocket walls situated between the lateral pocket walls, and
c. the device sleeve, when fully received within the dock interior pocket with the sleeve ridges fit within the ridge slots, has at least a major portion of at least one of:
   (1) the front sleeve side spaced from the front pocket wall, and
   (2) the rear sleeve side spaced from the rear pocket wall, with any portable electronic device within the device insertion space of the device sleeve having its device connection port directly interfaced with the dock port connector.

33. The docking system of claim 25 wherein:
a. the dock port connector extends from a standalone device situated within the dock connector portion, and
b. the standalone device includes one or more of:
   (1) a power supply;
   (2) a wireless receiver and/or transmitter;
   (3) a memory; and
   (4) a terminal connector and attached interface cable.

34. The docking system of claim 33 wherein:
a. the dock connector portion is formed in two or more dock connector portion sections,
b. the dock connector portion sections are connected about the standalone device to enclose the standalone device therein,
c. the connected dock connector portion sections define an opening through which the dock port connector extends, whereby the dock port connector is exposed on the dock connector portion.

35. The docking system of claim 25 wherein the dock interior pocket defines an internal passage within the dock receiver portion, with the dock interior pocket extending between:
a. a dock device insertion mouth into which the first device sleeve is received,
b. a dock connector insertion mouth spaced from the device insertion mouth, wherein the dock connector portion is removably engaged within the dock connector insertion mouth.

36. The docking system of claim 25, wherein:
a. the device sleeve includes a sleeve body having:
   (1) opposing top and bottom sleeve sides; and
   (2) opposing lateral sleeve sidewalls extending between the top and bottom sleeve sides, and
b. wherein the sleeve body is thinner at a location:
   (1) spaced at least substantially halfway between the sleeve sidewalls, and
   (2) extending between the top and bottom sleeve sides.

37. The docking system of claim 25, wherein the device sleeve includes a sleeve body having:
a. opposing top and bottom sleeve sides, and
b. opposing lateral sleeve sidewalls extending between the top and bottom sleeve sides, wherein the sleeve sidewalls:
   (1) extend outwardly from the sleeve body to define a device insertion space between the sleeve sidewalls and adjacent the sleeve body,
   (2) include inner sidewall faces facing inwardly toward each other across the device insertion space, the inner sidewall faces being concave, and
   (3) are spaced at least substantially uniformly away from each other save for at the top and bottom sleeve sides, where the sleeve sidewalls extend inwardly toward each other,
whereby a channel is defined between the sleeve sidewalls and adjacent the sleeve body, the channel being narrower at the top and bottom sleeve sides and broader therebetween.

38. The docking system of claim 37, wherein the sleeve body is thinner at a location:
a. spaced at least substantially halfway between the sleeve sidewalls, and
b. extending between the top and bottom sleeve sides.

39. The docking system of claim 38 wherein:
a. the sleeve sidewalls extend outwardly from the sleeve body between a rear sleeve side and a front sleeve side,
b. the sleeve sidewalls include outer sidewall faces opposite their inner sidewall faces, and
c. the outer sidewall faces each include a sleeve ridge thereon extending in a direction between the top and bottom sleeve sides, the sleeve ridge being spaced closer to the front sleeve side than the rear sleeve side.

40. The docking system of claim 39 wherein:
a. the dock interior pocket has opposing pocket walls with ridge slots defined therein, and
b. the sleeve ridges of the outer sidewall faces engage within the ridge slots when the device sleeve is received within the dock interior pocket, with the sleeve ridges and ridge slots guiding the device connection port of the portable electronic device to directly interface with the dock port connector of the device dock.

41. The docking system of claim 39 further including a sleeve cover having:
a. a cover body,
b. opposing top and bottom cover sides, and
c. opposing lateral cover sidewalls extending between the top and bottom cover sides, wherein the cover sidewalls:
   (1) extend outwardly from the cover body to define a sleeve insertion space between the cover sidewalls and adjacent the cover body,
   (2) include inner sidewall faces facing inwardly toward each other across the sleeve insertion space, the inner sidewall faces being concave,
the sleeve cover being configured to receive the sleeve within the sleeve insertion space with the sleeve ridges being received within the concave inner sidewall faces of the cover sidewalls.

\* \* \* \* \*